Figure 3A:
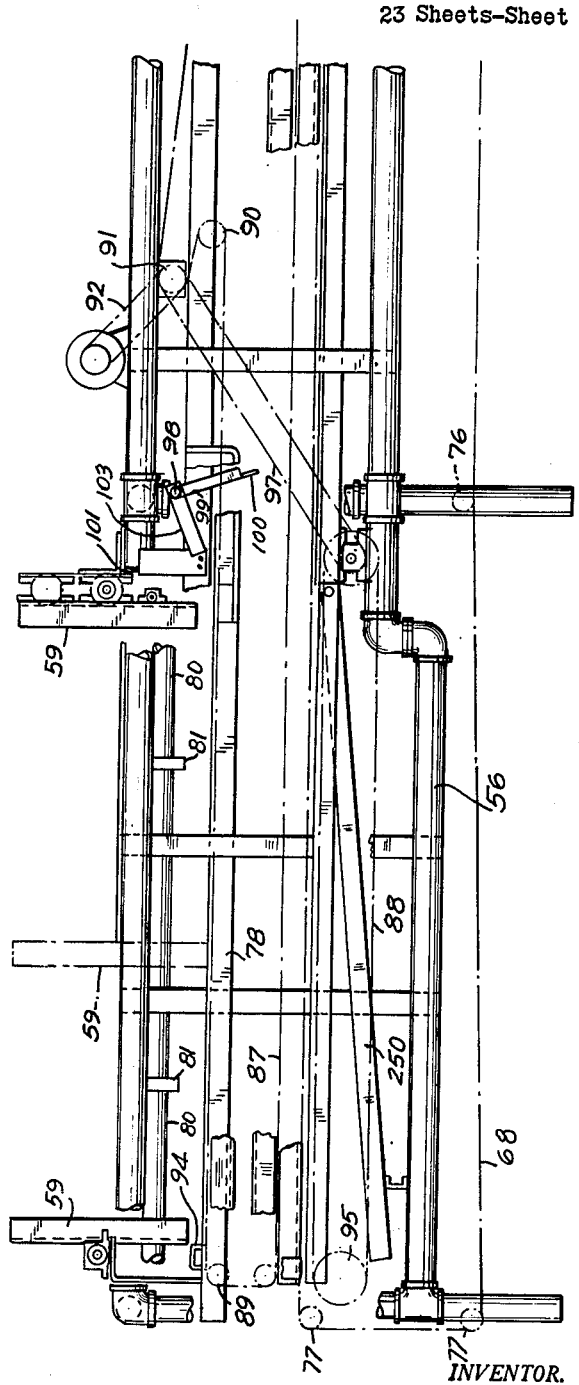

July 20, 1965  T. D. HADNAGY  3,195,793
PALLET OR PLATFORM PRODUCING MACHINE
Filed May 10, 1962  23 Sheets-Sheet 1
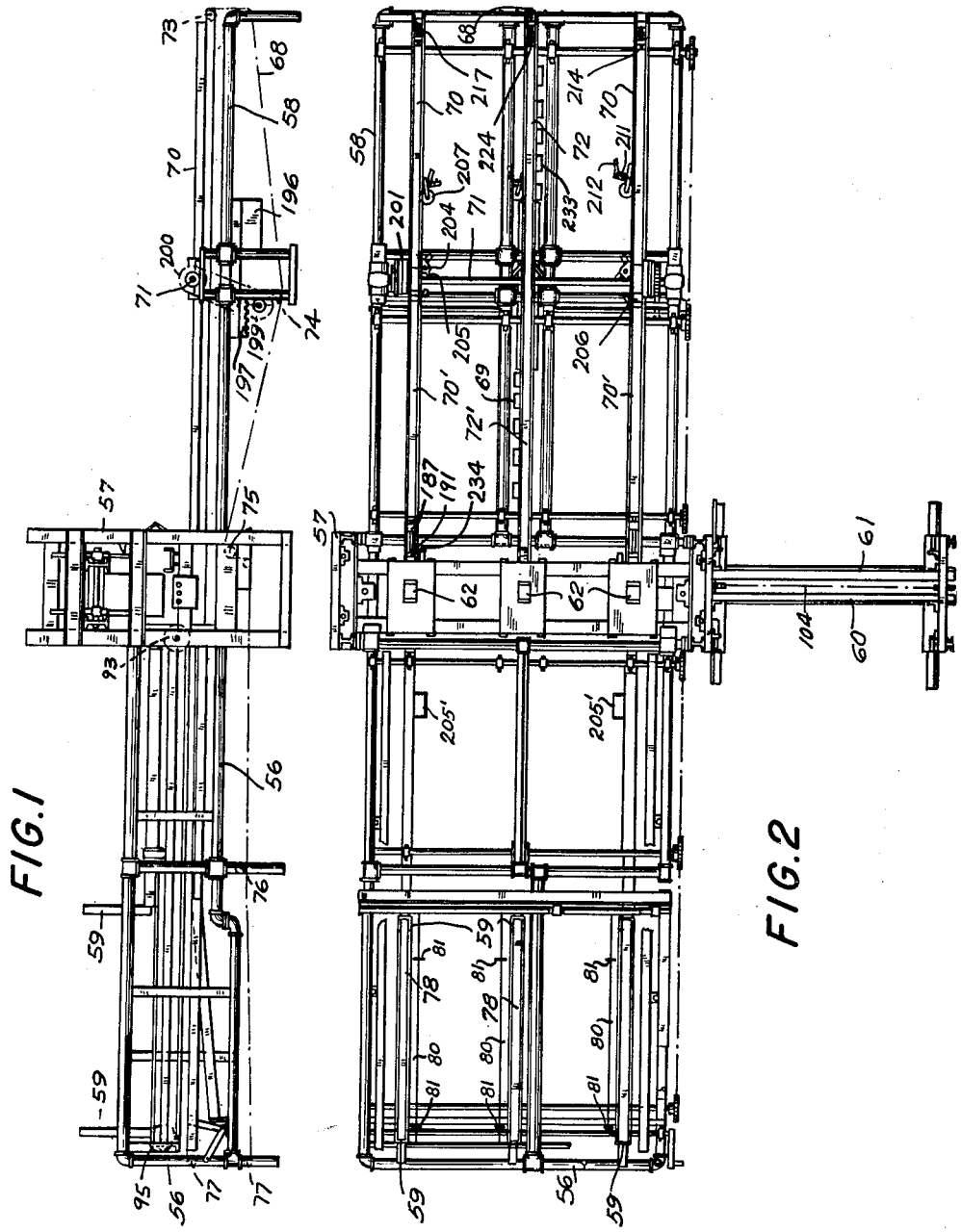
INVENTOR.
THOMAS D. HADNAGY
BY
ATTORNEYS July 20, 1965 T. D. HADNAGY 3,195,793
PALLET OR PLATFORM PRODUCING MACHINE
Filed May 10, 1962 23 Sheets-Sheet 2

INVENTOR.
THOMAS D. HADNAGY
BY
Kane, Dalsimer and Kane
ATTORNEYS

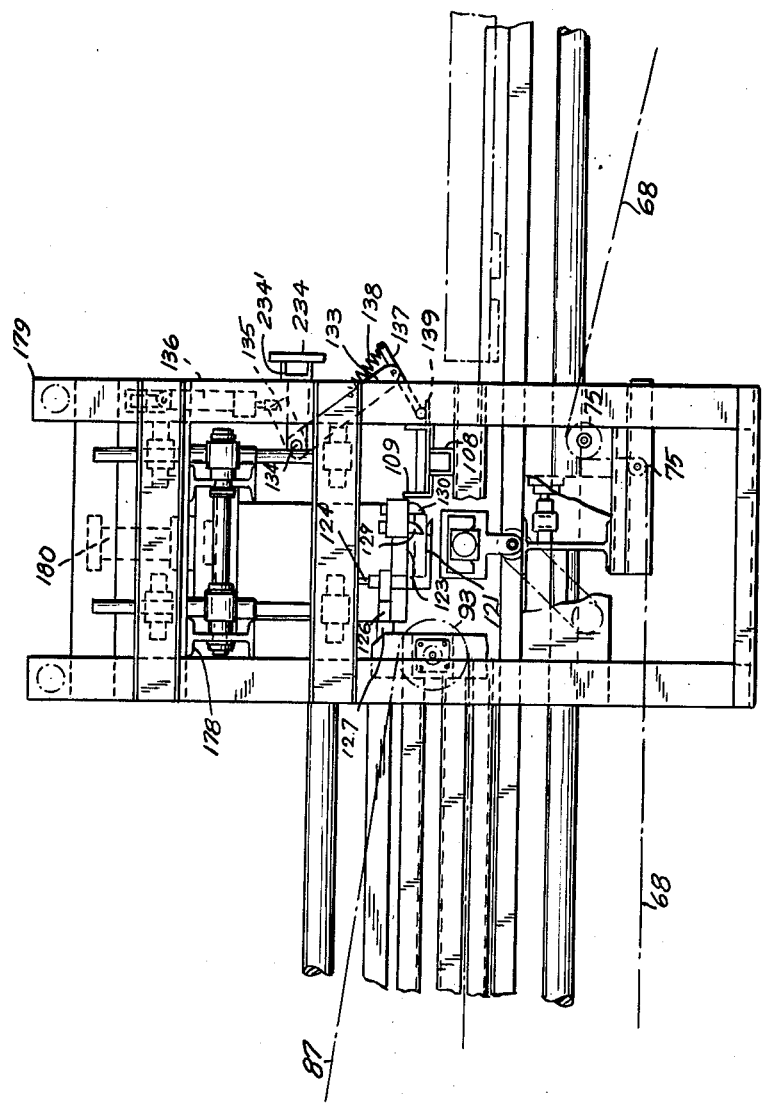

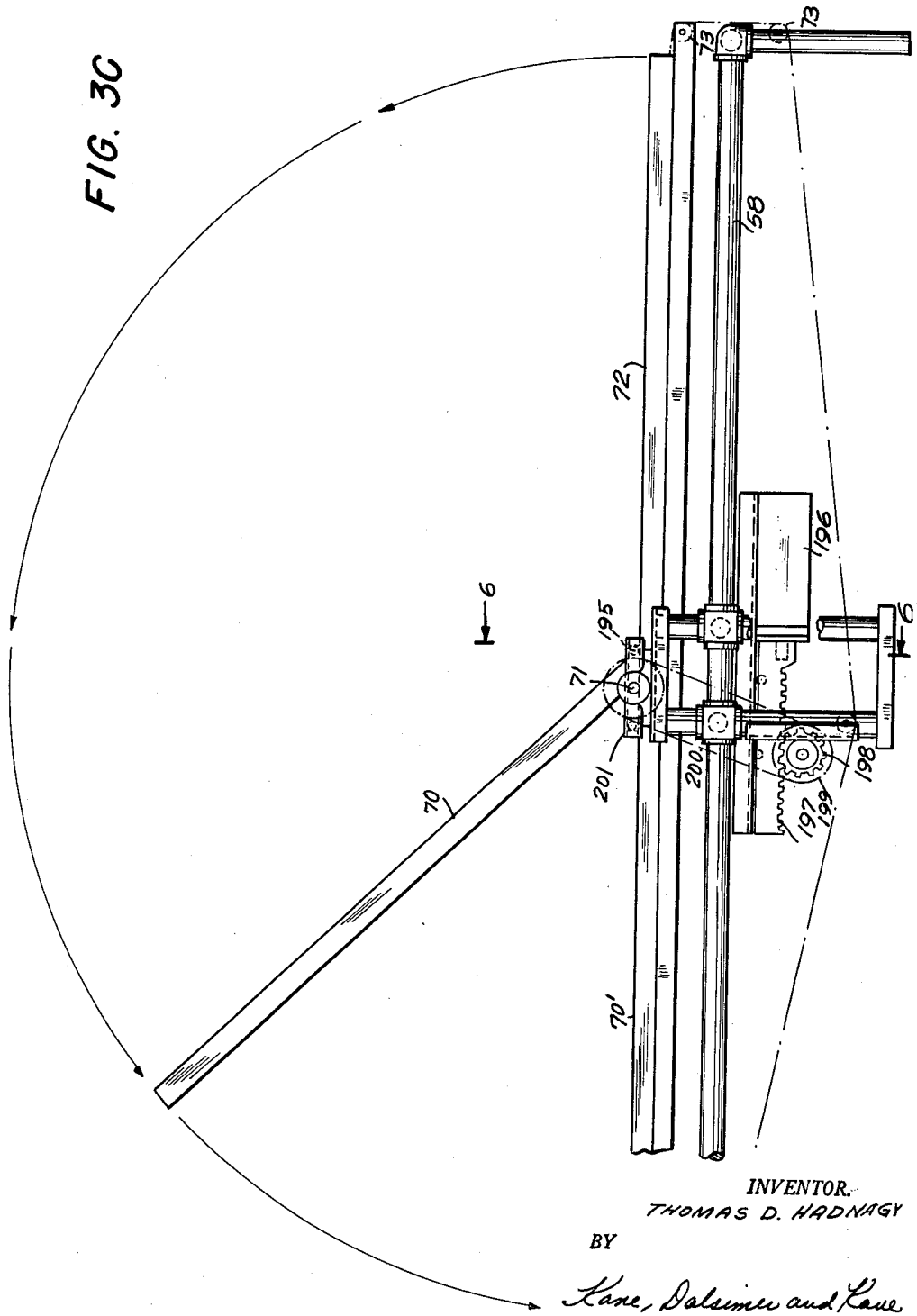

July 20, 1965   T. D. HADNAGY   3,195,793
PALLET OR PLATFORM PRODUCING MACHINE
Filed May 10, 1962   23 Sheets-Sheet 5
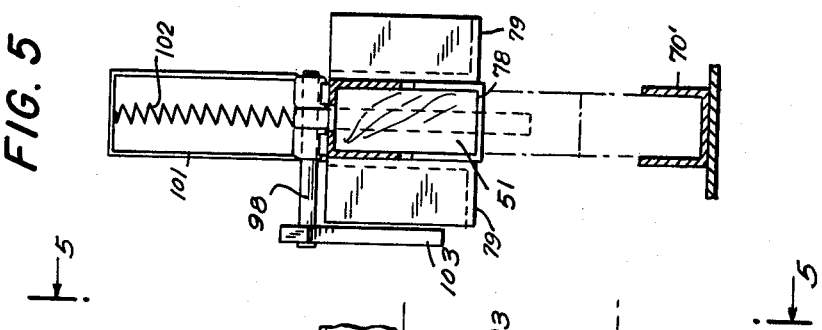
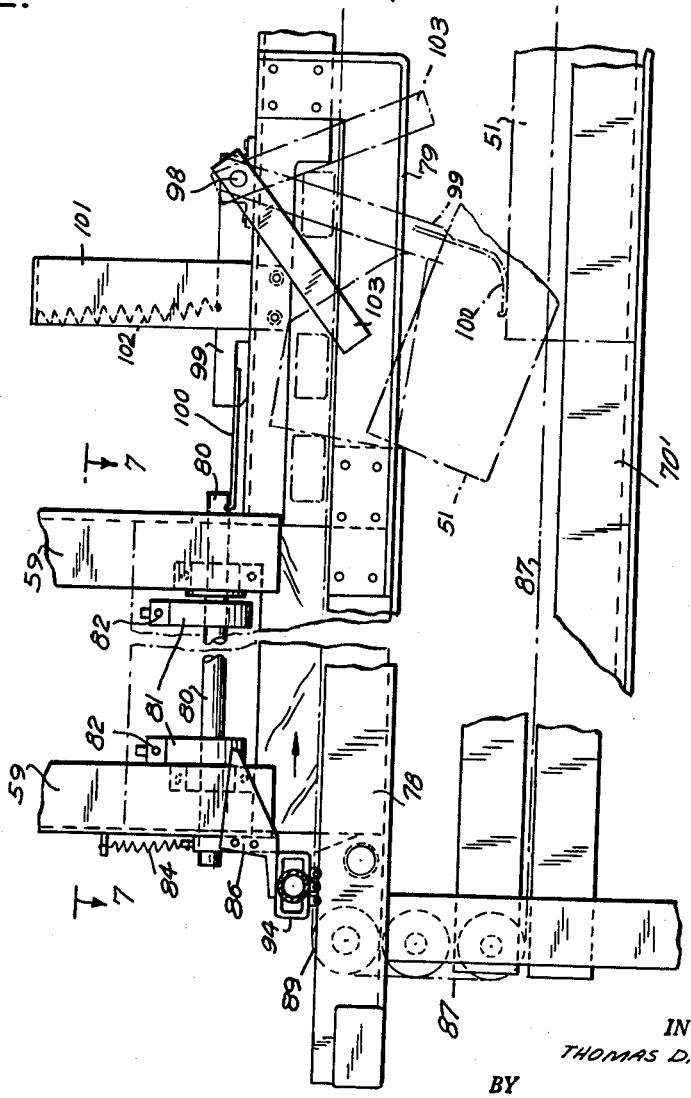
INVENTOR.
THOMAS D. HADNAGY
BY
Kane, Dalsimer and Kane
ATTORNEYS July 20, 1965  T. D. HADNAGY  3,195,793
PALLET OR PLATFORM PRODUCING MACHINE
Filed May 10, 1962  23 Sheets-Sheet 6

INVENTOR.
THOMAS D. HADNAGY
BY
Kane, Dalsimer and Kane
ATTORNEYS

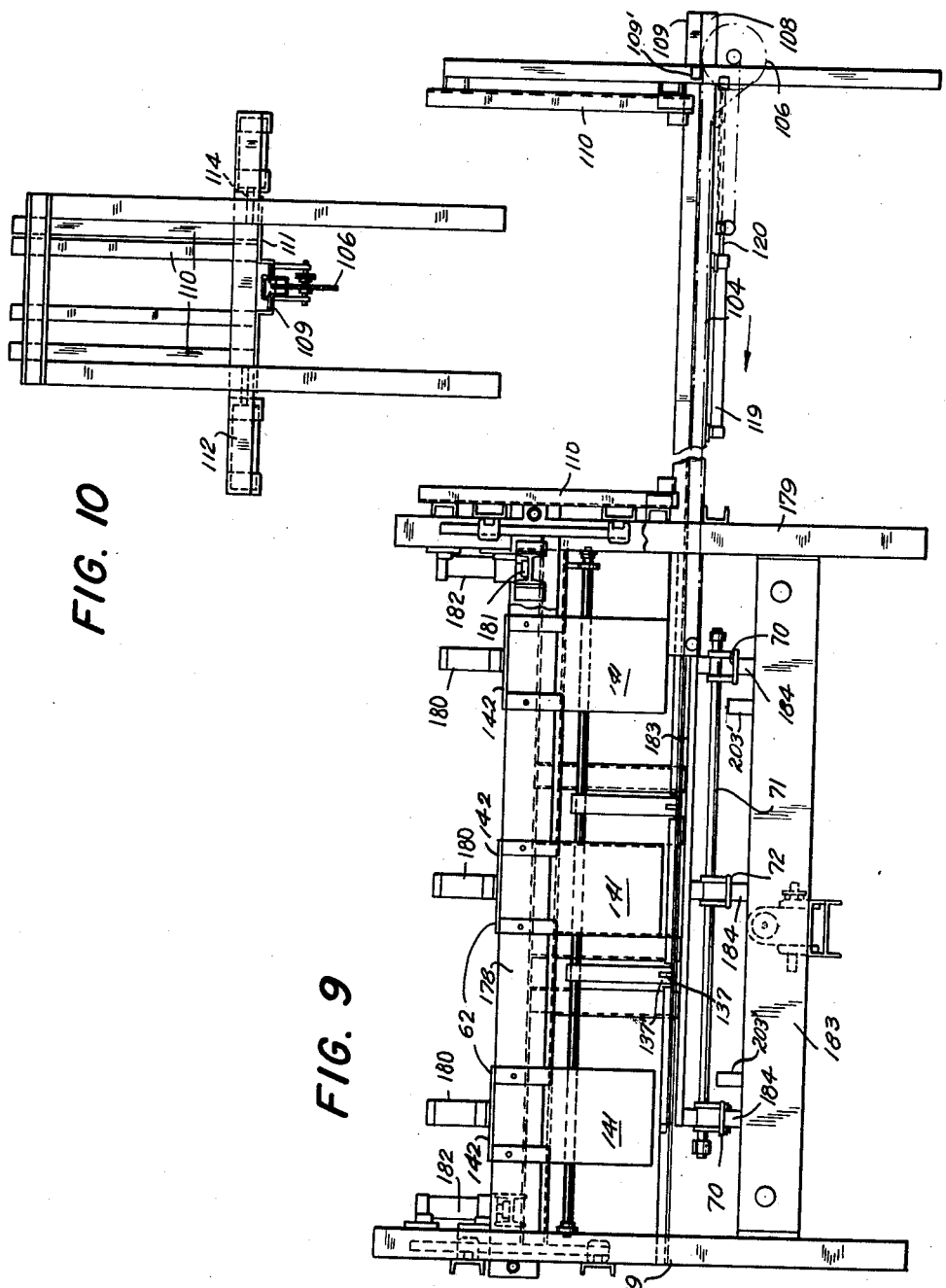

July 20, 1965 T. D. HADNAGY 3,195,793
PALLET OR PLATFORM PRODUCING MACHINE
Filed May 10, 1962 23 Sheets-Sheet 8
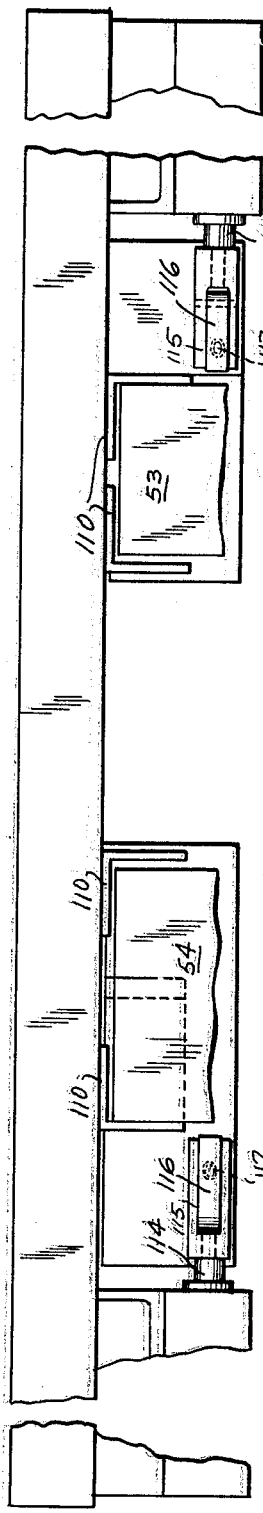
INVENTOR.
THOMAS D. HADNAGY
BY
Kane, Dalsimer and Kane
ATTORNEYS July 20, 1965  T. D. HADNAGY  3,195,793
PALLET OR PLATFORM PRODUCING MACHINE
Filed May 10, 1962  23 Sheets-Sheet 9

INVENTOR.
THOMAS D. HADNAGY
BY
Kane, Dalsimer and Kane
ATTORNEYS

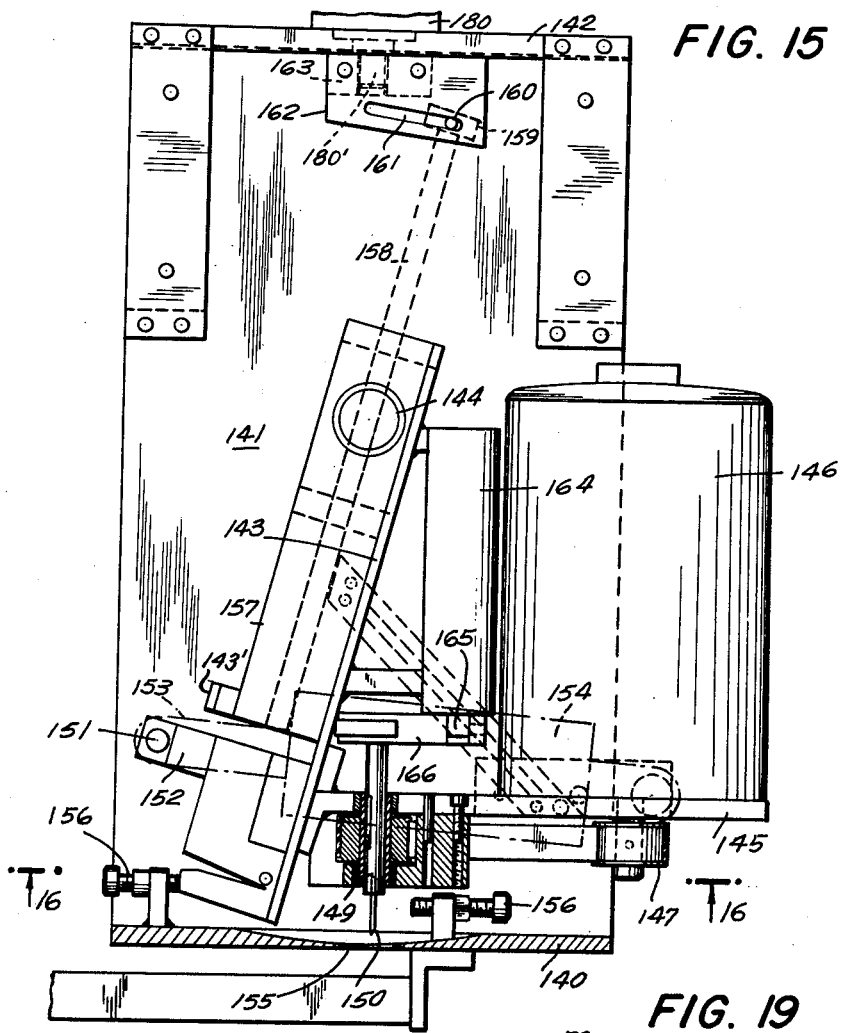
July 20, 1965     T. D. HADNAGY     3,195,793
PALLET OR PLATFORM PRODUCING MACHINE
Filed May 10, 1962     23 Sheets-Sheet 10
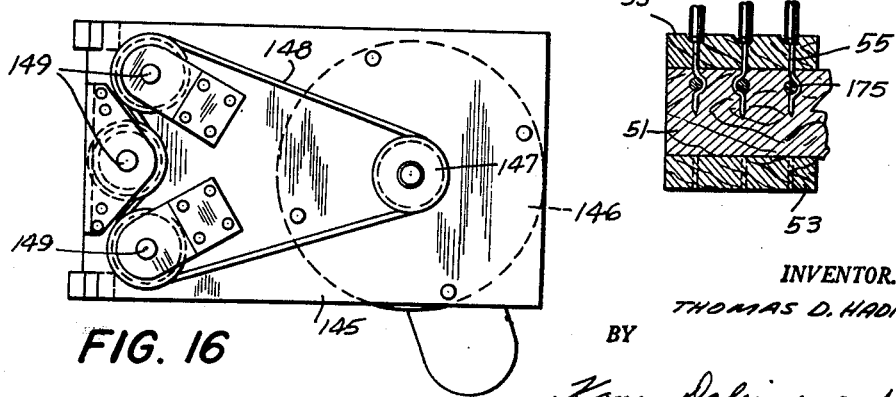
INVENTOR.
THOMAS D. HADNAGY
BY
Kane, Dalsimer and Kane
ATTORNEYS July 20, 1965 T. D. HADNAGY 3,195,793
PALLET OR PLATFORM PRODUCING MACHINE
Filed May 10, 1962 23 Sheets-Sheet 11

INVENTOR.
THOMAS D. HADNAGY
BY
Kane, Dalsimer and Kane
ATTORNEYS

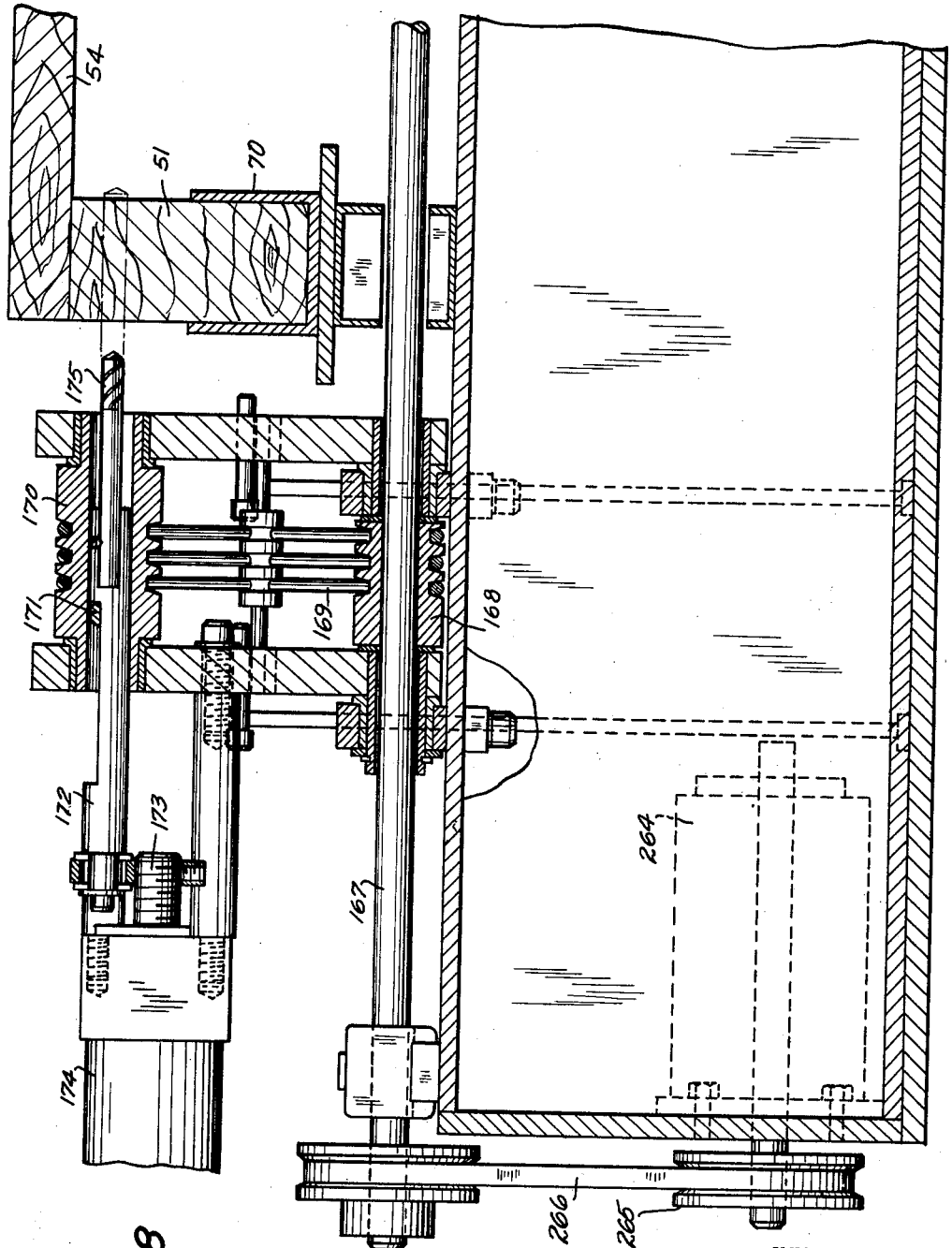

July 20, 1965 T. D. HADNAGY 3,195,793
PALLET OR PLATFORM PRODUCING MACHINE
Filed May 10, 1962 23 Sheets-Sheet 13
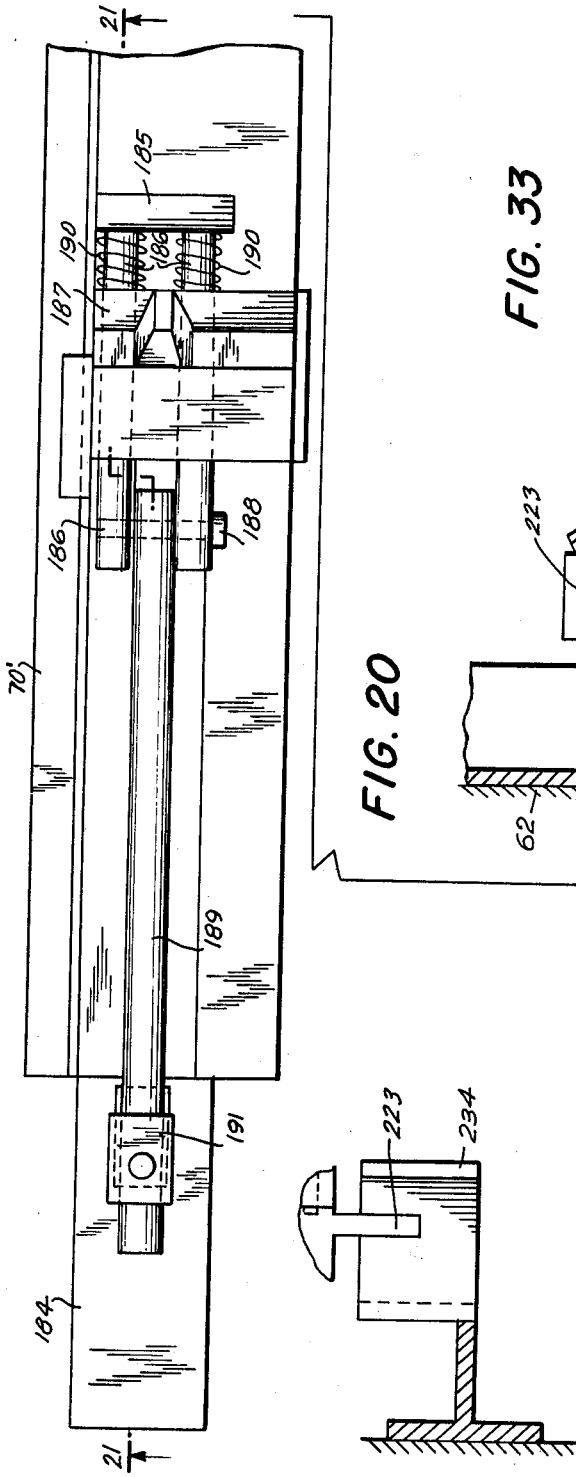
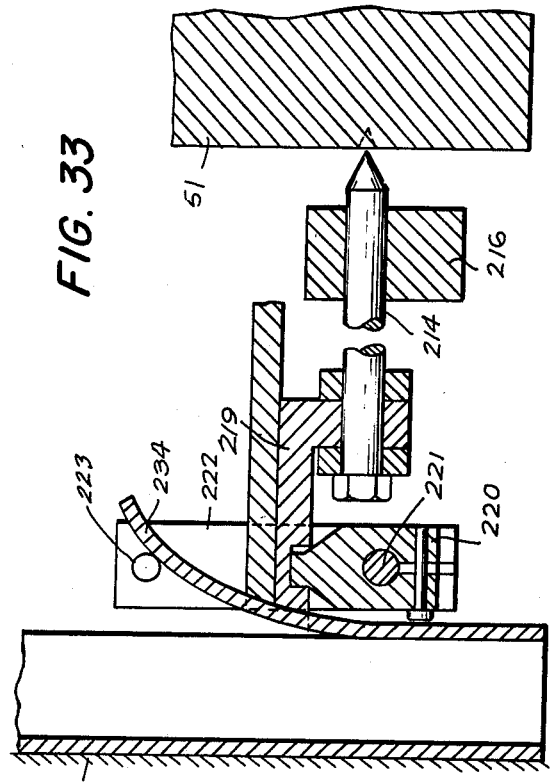
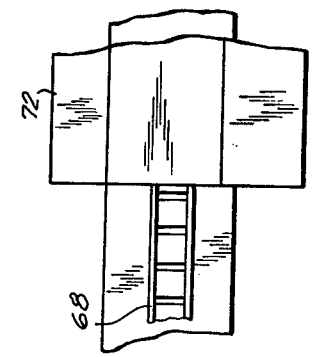
INVENTOR.
THOMAS D. HADNAGY
BY
Kane, Dalsimer and Kane
ATTORNEYS

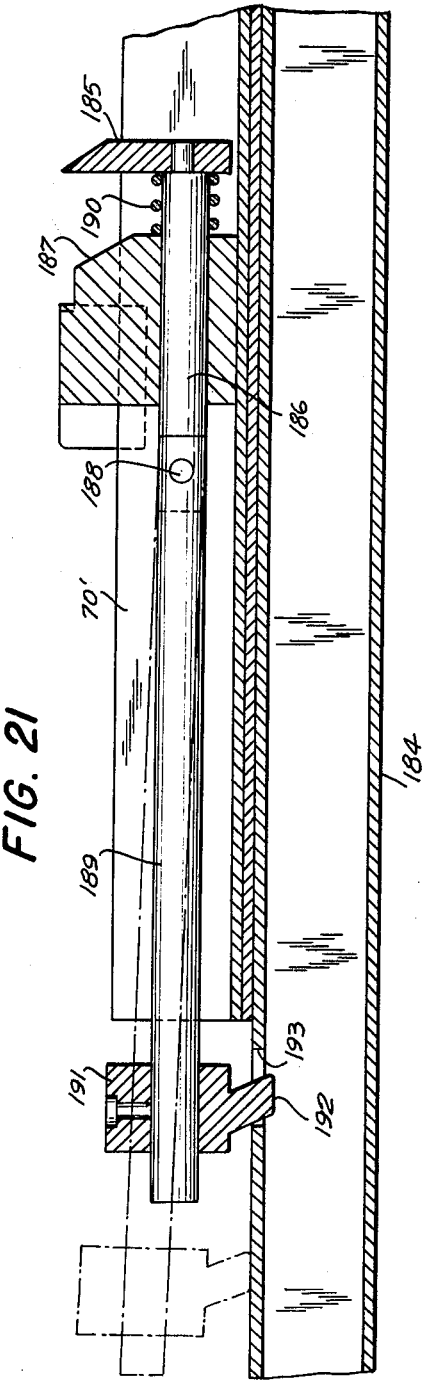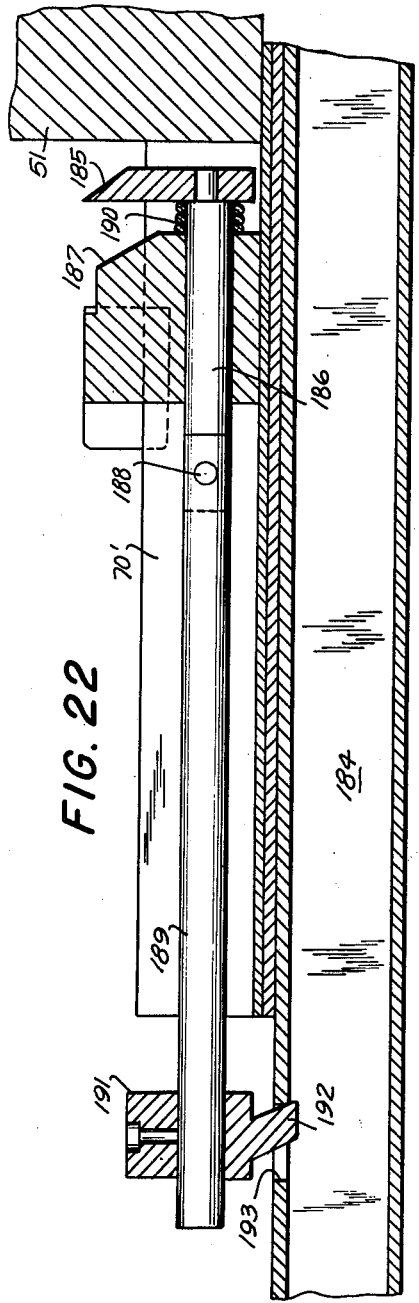

July 20, 1965
T. D. HADNAGY
3,195,793
PALLET OR PLATFORM PRODUCING MACHINE
Filed May 10, 1962
23 Sheets-Sheet 15
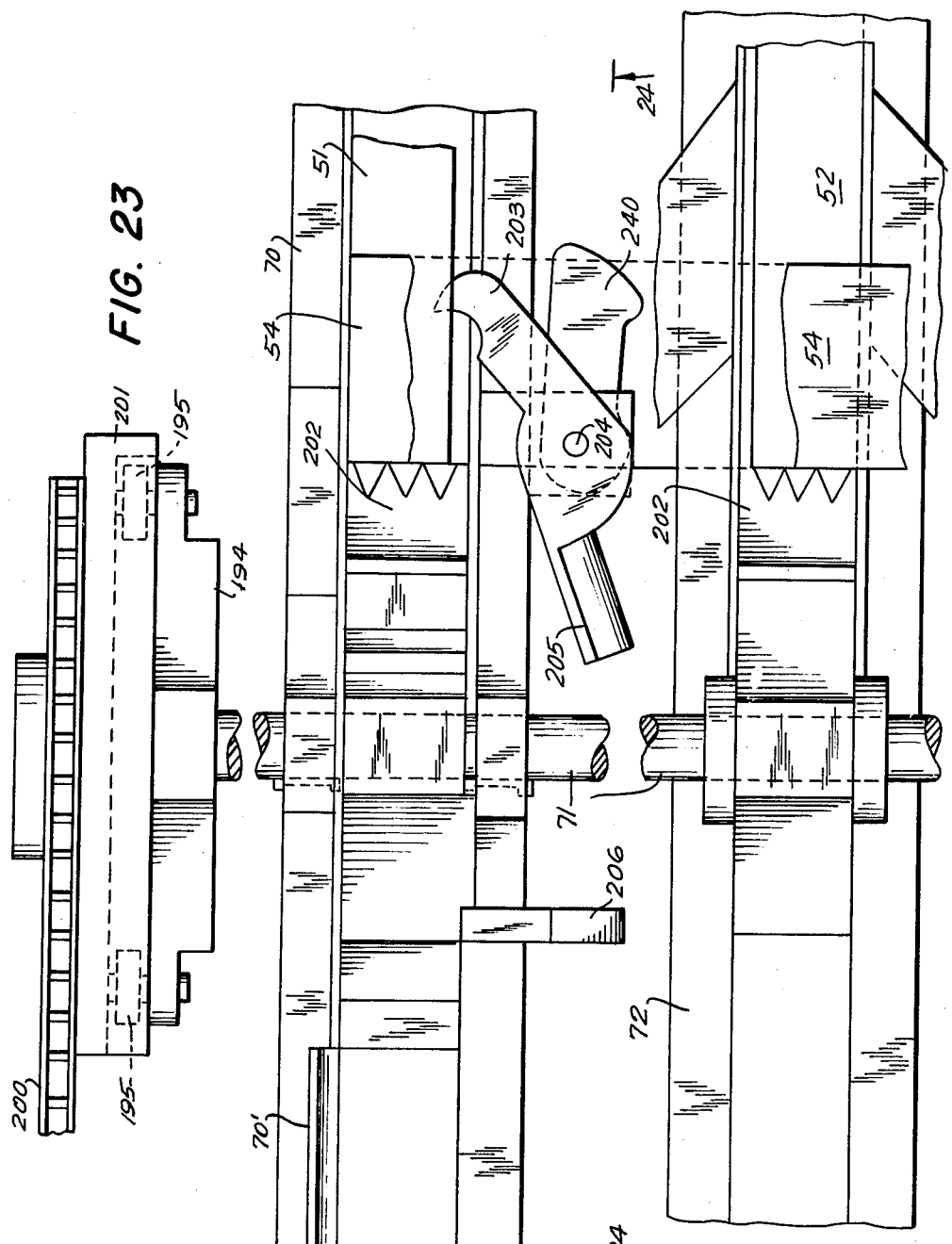
INVENTOR.
THOMAS D. HADNAGY
BY
Kane, Dalsimer and Kane
ATTORNEYS

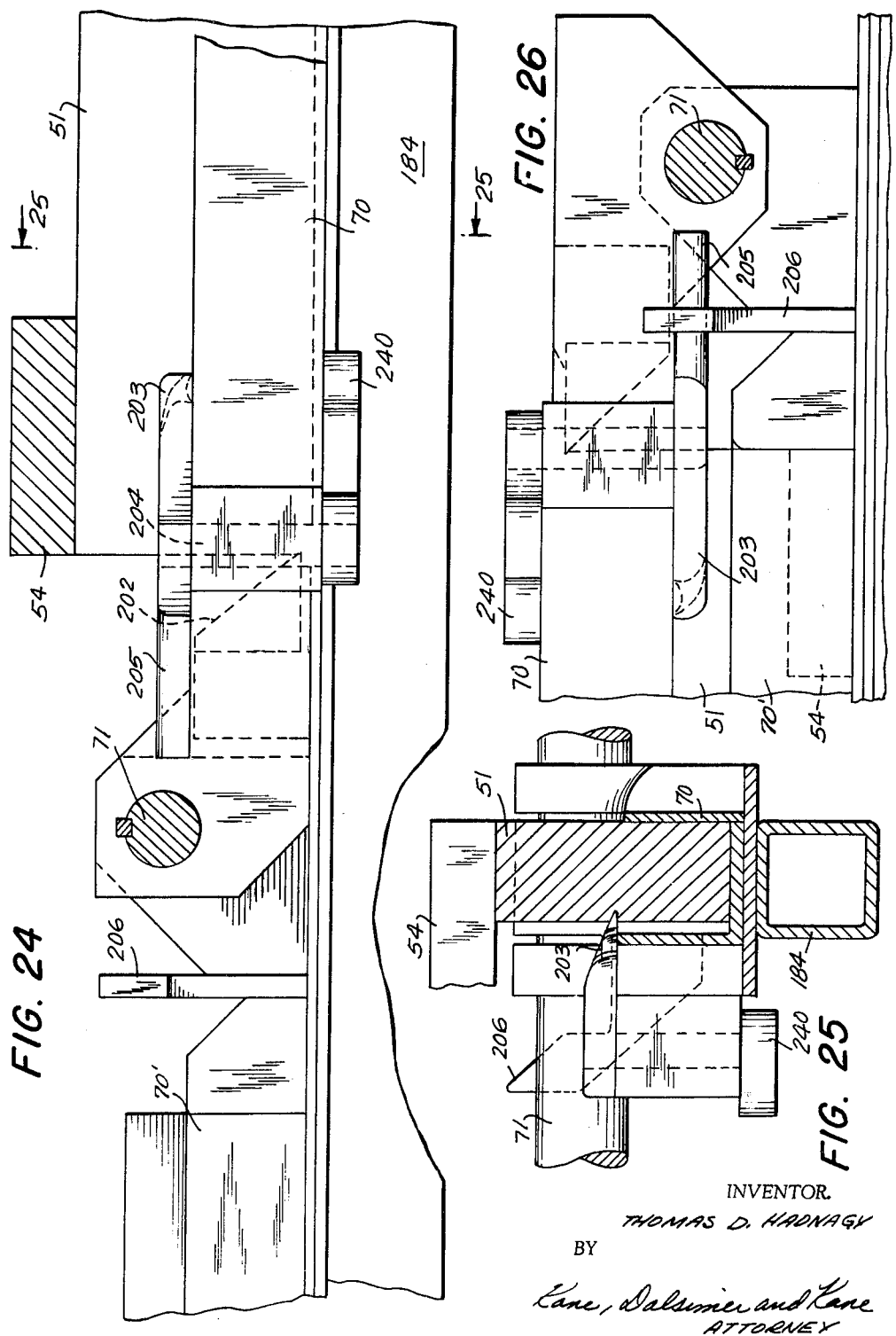

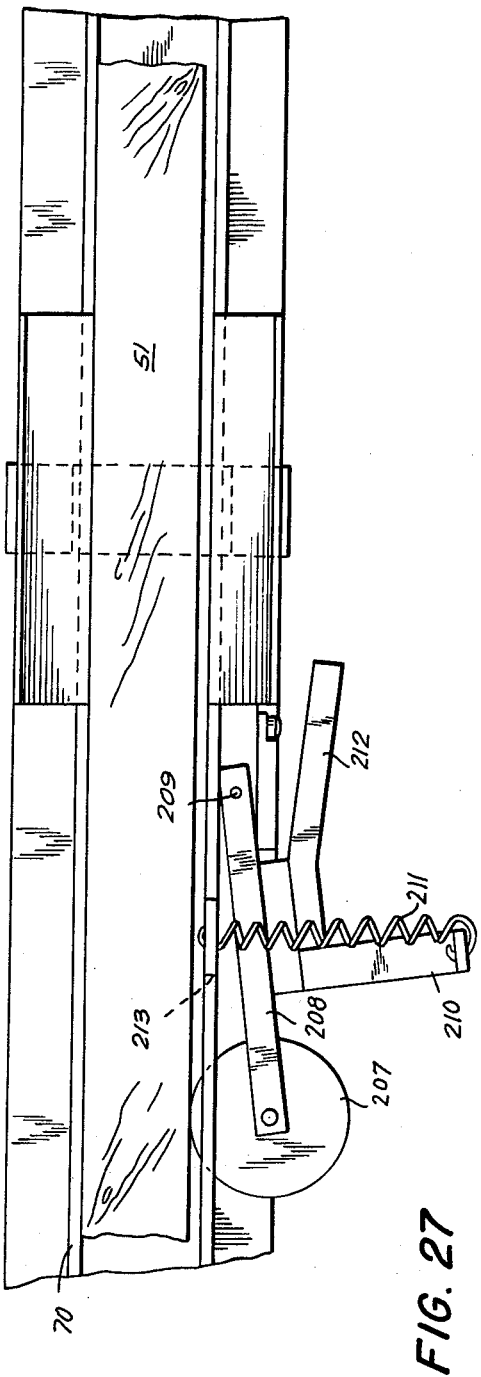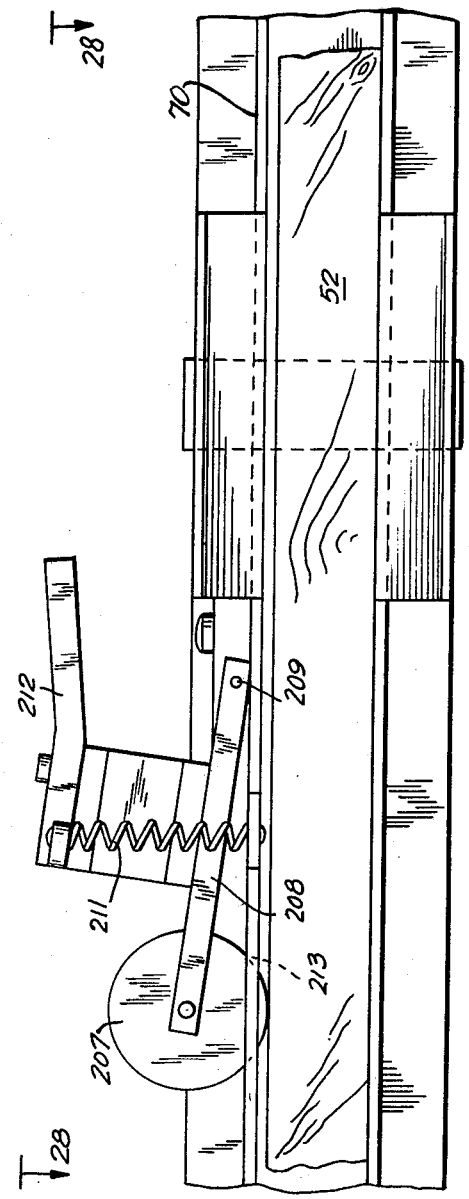
FIG. 27
INVENTOR.
THOMAS D. HADNAGY

July 20, 1965 T. D. HADNAGY 3,195,793
PALLET OR PLATFORM PRODUCING MACHINE
Filed May 10, 1962 23 Sheets-Sheet 18
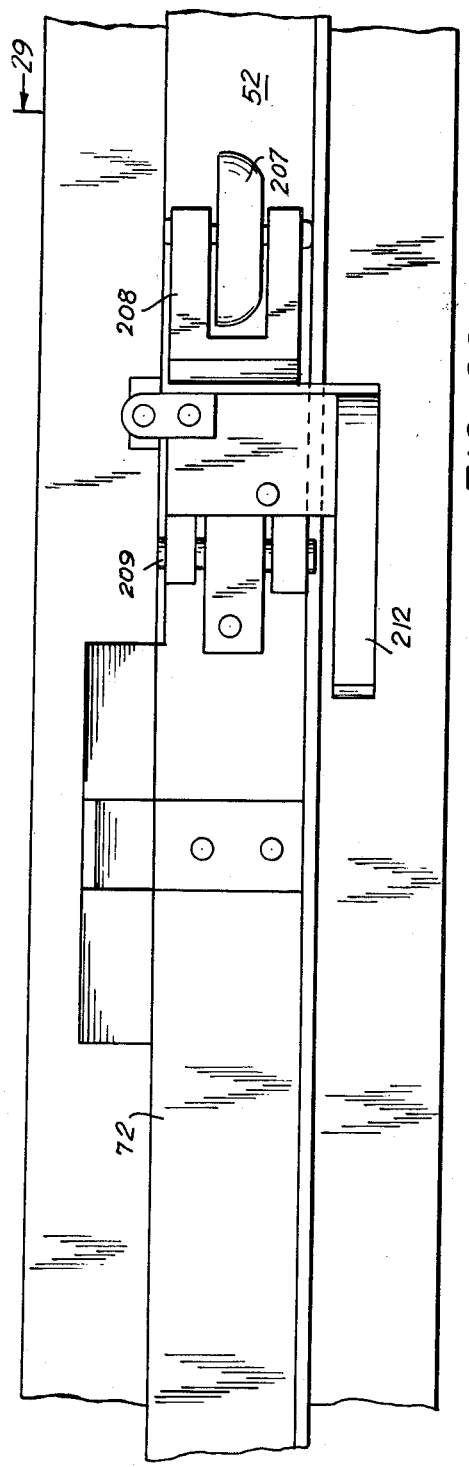
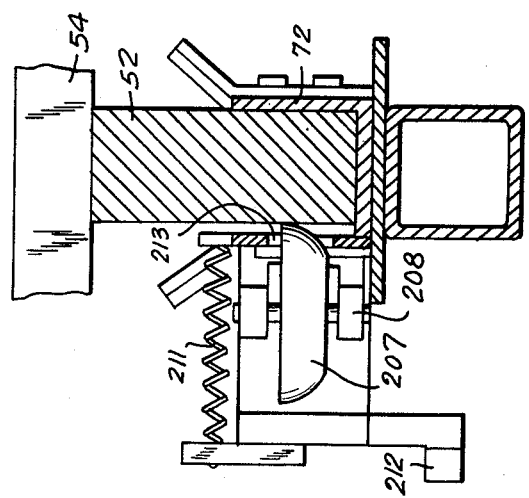
INVENTOR.
THOMAS D. HADNAGY
BY
Kane, Dalsimer and Kane
ATTORNEYS

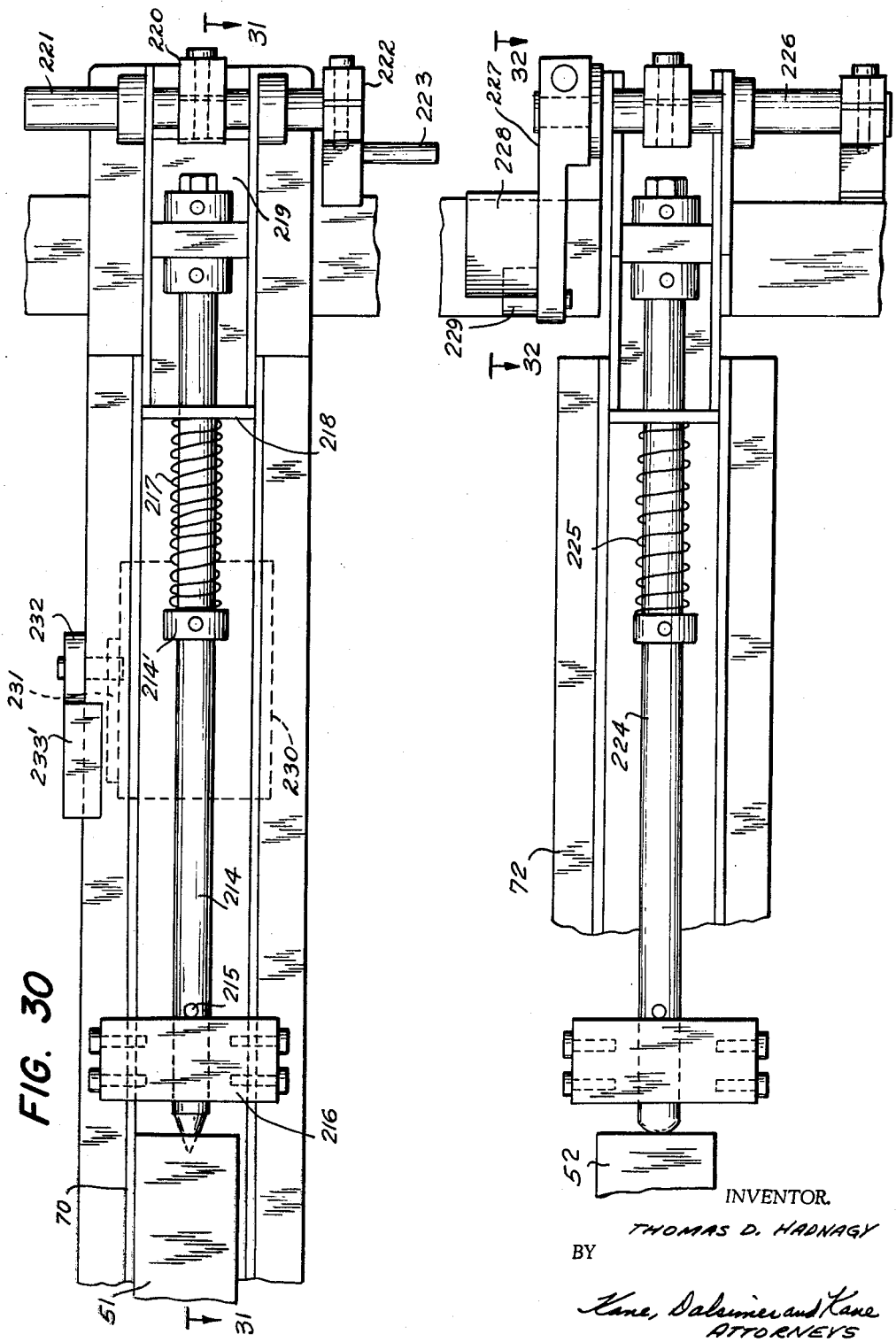

July 20, 1965 T. D. HADNAGY 3,195,793
PALLET OR PLATFORM PRODUCING MACHINE
Filed May 10, 1962 23 Sheets-Sheet 20
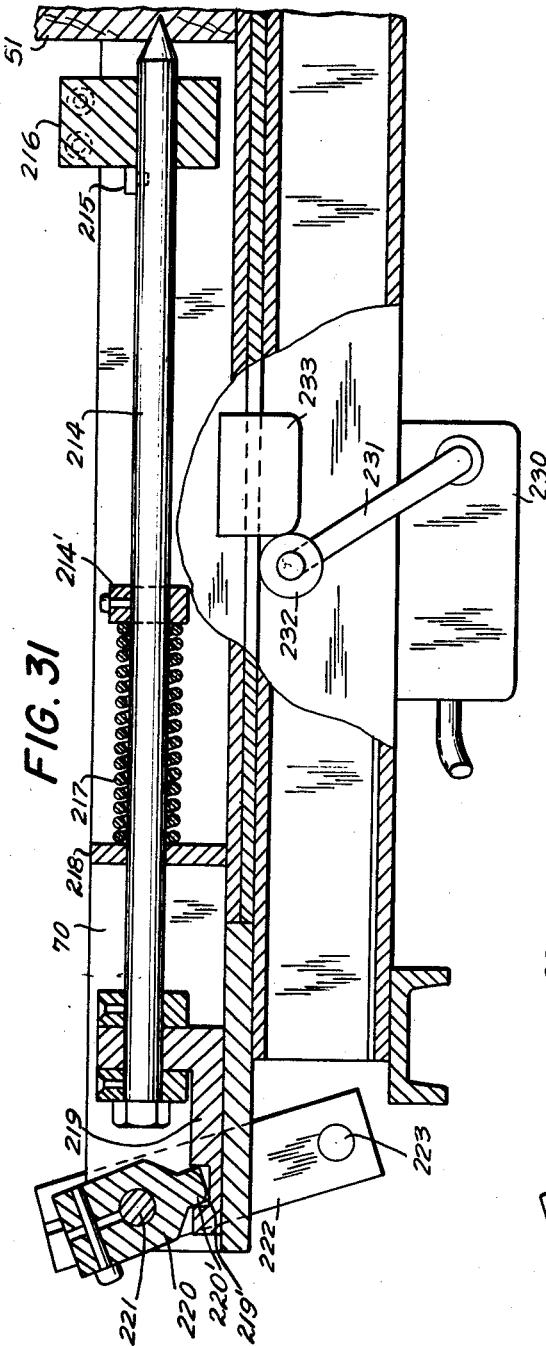
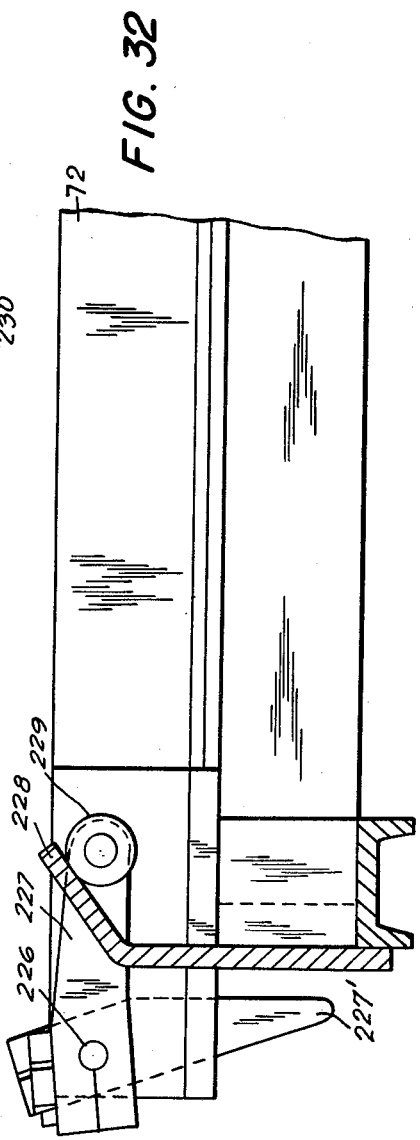
INVENTOR.
THOMAS D. HADNAGY
BY
Kane, Dalsimer and Kane
ATTORNEYS July 20, 1965     T. D. HADNAGY     3,195,793

PALLET OR PLATFORM PRODUCING MACHINE

Filed May 10, 1962     23 Sheets-Sheet 21

INVENTOR.
THOMAS D. HADNAGY
BY

*Kane, Dalsimer and Kane*
ATTORNEYS

July 20, 1965  T. D. HADNAGY  3,195,793
PALLET OR PLATFORM PRODUCING MACHINE
Filed May 10, 1962  23 Sheets-Sheet 22

INVENTOR.
THOMAS D. HADNAGY
BY
Kane, Dalsimer and Kane
ATTORNEYS

July 20, 1965 T. D. HADNAGY 3,195,793
PALLET OR PLATFORM PRODUCING MACHINE
Filed May 10, 1962 23 Sheets-Sheet 23

INVENTOR.
THOMAS D. HADNAGY
BY
Kane, Dalsimer and Kane
ATTORNEYS

United States Patent Office 3,195,793
Patented July 20, 1965

3,195,793
PALLET OR PLATFORM PRODUCING
MACHINE
Thomas D. Hadnagy, 17 Briar Lane, Roslyn Heights, N.Y.
Filed May 10, 1962, Ser. No. 193,787
16 Claims. (Cl. 227—27)

This invention relates to a structurally and functionally improved machine primarily dedicated to the manufacture of pallets or platforms for supporting merchandise. These pallets or platforms are of the type to be engaged, hoisted and transported by a conveyance commonly having associated with it a lift of fork design by means of which a pallet may be elevated or lowered and also moved, together with merchandise supported thereby, to desired locations.

This application is a continuation-in-part of my prior application for United States Patent Serial No. 81,669, filed January 6, 1961, now Patent No. 3,045,558, dated July 31, 1962, and entitled "Machine for Manufacturing Merchandise-Supporting Pallets or Platforms"; that application being in turn a continuation of an earlier application filed in the United States Patent Office on February 5, 1958, and identified under Serial No. 713,399, now abandoned.

It is a primary object of the invention to furnish a machine which will preferably be automatic in operation and thus require only a minimum of manual supervision. Such supervision will not require the attendance of a skilled operator. Rather, under normal conditions the operator will merely have to periodically load certain materials into the machine and remove completed platforms or pallets therefrom.

A further object is that of designing an apparatus which will include a relatively simple mechanism the components of which may be readily assembled to provide a machine operating over long periods of time with freedom from all difficulties.

Figure 6:
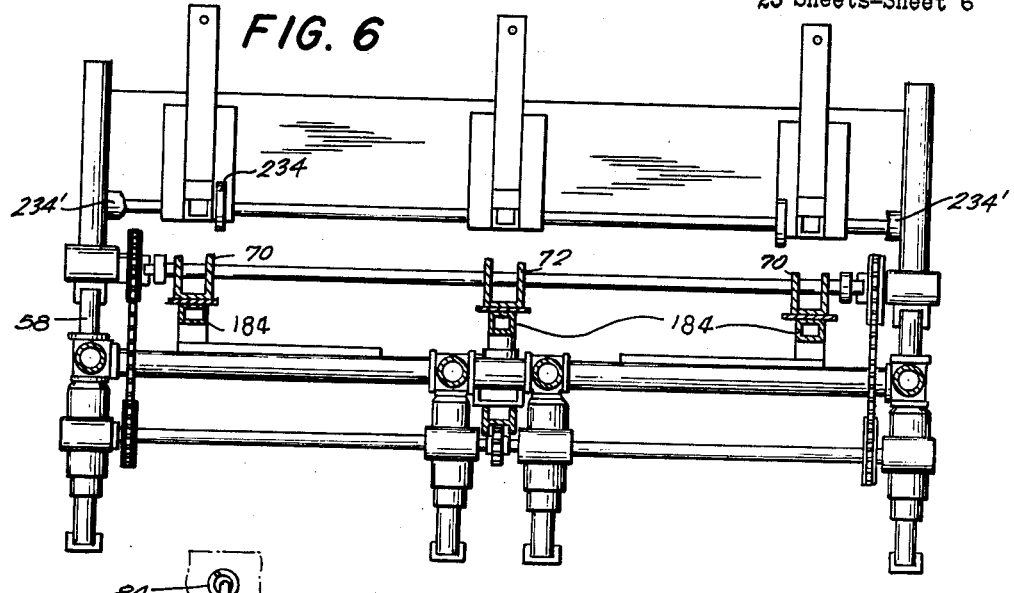
Figure 7:
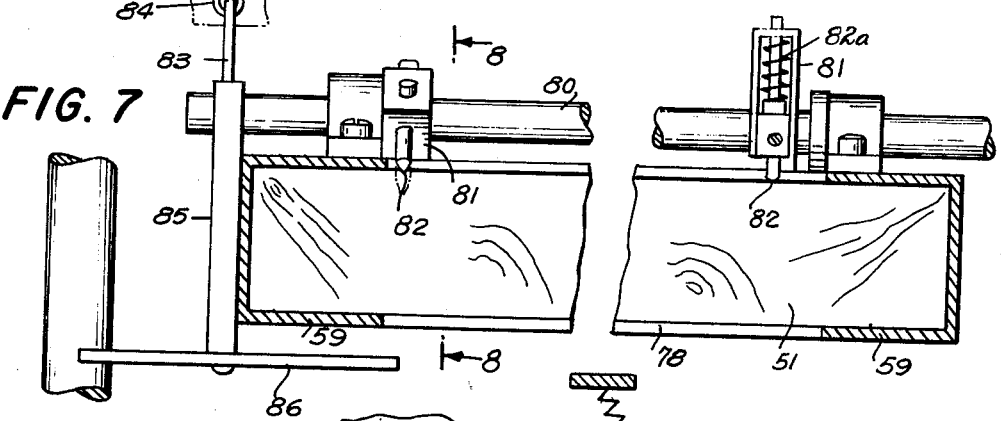
Figure 8:
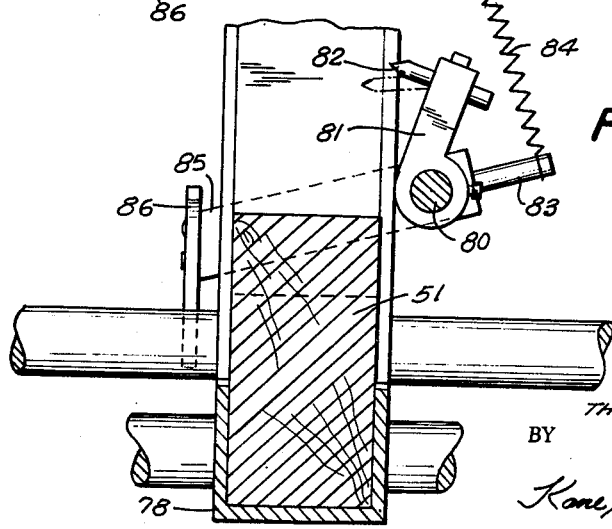
Figure 13:
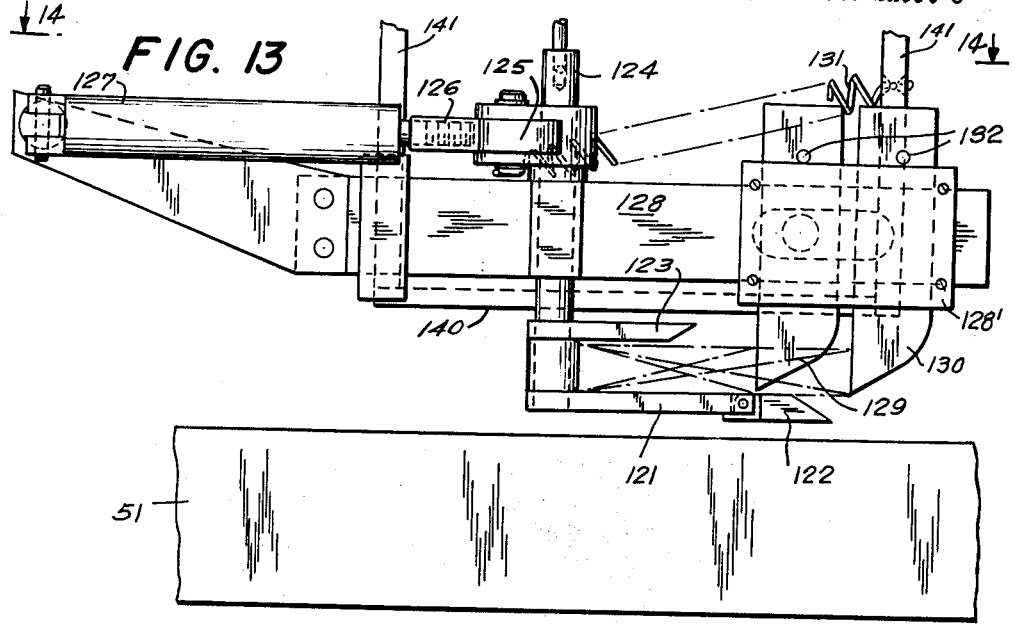
Figure 14:
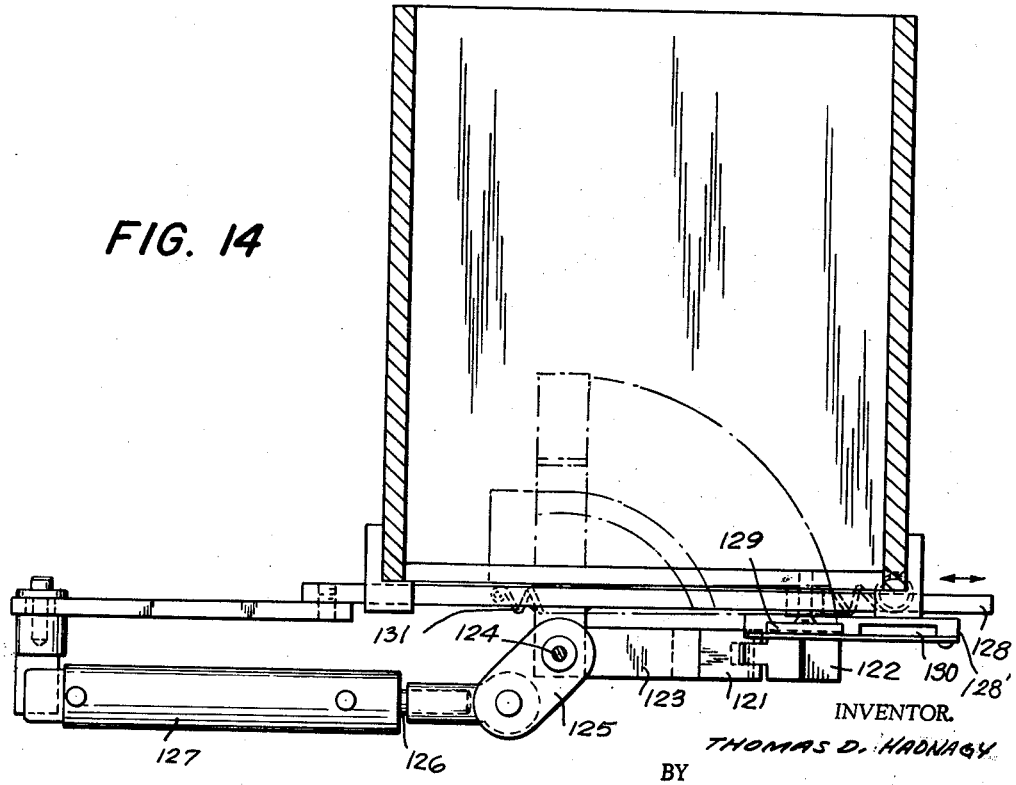
Figure 17:
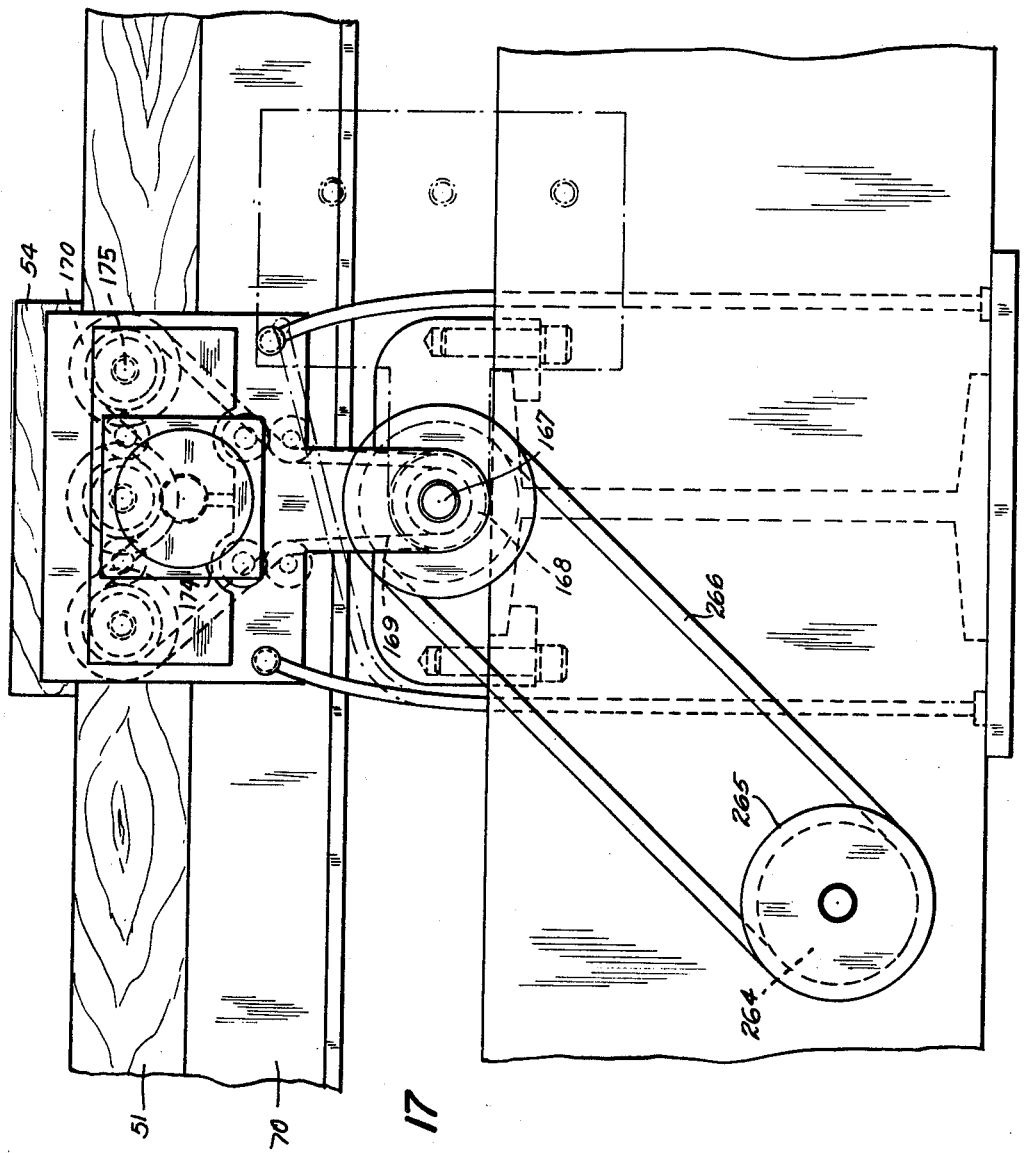
Figure 34:
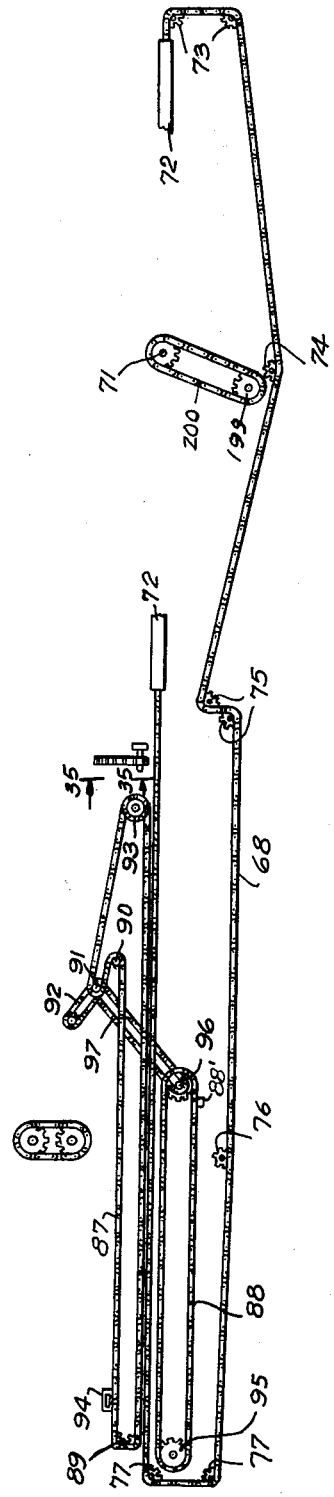
Figure 35:
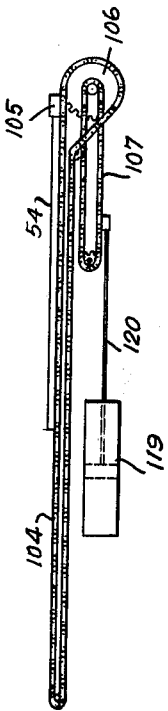
Figure 36:
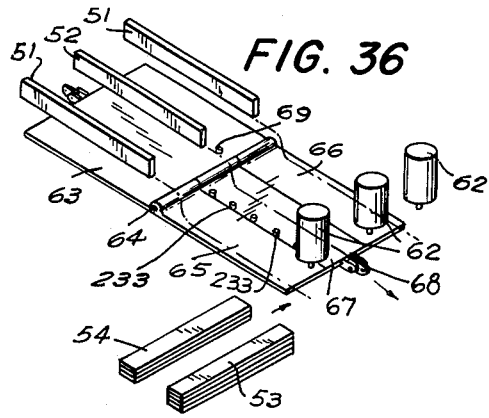

With these and other objects in mind, reference is had to the attached sheets of drawings illustrating practical embodiments of the invention and in which:

FIG. 1 is a side elevation of the entire machine;
FIG. 2 is a top plan view thereof;
FIG. 3a is a fragmentary side elevation in enlarged scale showing the forward end of the machine;
FIG. 3b is a similar view of the central portion of the machine;
FIG. 3c is a further view of this type showing the rear end of the apparatus;
FIG. 4 is a fragmentary view illustrating the transfer of the longitudinal members or beams of the pallets from the magazines to the conveying or carriage mechanism;
FIG. 5 is a sectional end view taken along the line 5—5 in the direction of the arrows as indicated in FIG. 4;
FIG. 6 is a transverse sectional view taken along the line 6—6 in the direction of the arrows as indicated in FIG. 3c;
FIG. 7 is a sectional plan view taken along the line 7—7 in the direction of the arrows as indicated in FIG. 4;
FIG. 8 shows in transverse section taken along the line 8—8 in the direction of the arrows of FIG. 7 the mechanism illustrated in the latter figure;
FIG. 9 is an elevational view taken through the center of the machine;
FIG. 10 is a similar view of an adjacent mechanism for feeding or delivering the slats or cross pieces of the pallet;
FIG. 11 is a plan view of the magazine provided for the different types of cross members;
FIG. 12 is a side view thereof;
FIG. 13 shows in side elevation a mechanism employed to control the fork structure;
FIG. 14 is a plan view taken along the line 14—14 in the direction of the arrows as indicated in FIG. 13;
FIG. 15 is a partly-sectional side view of the nail feeding and clamping mechanism;
FIG. 16 is a bottom plan view taken along the line 16—16 in the direction of the arrows as indicated in FIG. 15;
FIG. 17 is a front view of the drilling unit employed in connection with the crimping of the nails or equivalent securing devices;
FIG. 18 is a partly-sectional side view of that mechanism;
FIG. 19 is a fragmentary showing of the beam and cross members of a pallet secured together;
FIG. 20 is a plan view of one of the units employed to retain an adjacent longitudinal or beam member of the pallet in proper position;
FIG. 21 is a sectional view taken along the line 21—21 of FIG. 20 illustrating the positions of the parts under certain conditions of operation;
FIG. 22 is a similar view showing those parts under a different condition;
FIG. 23 is a fragmentary plan view of one of the assemblies employed to assure a proper disposition of the end slat or cross members with respect to the longitudinal or beam members of the pallet;
FIG. 24 is a sectional side view taken along the line 24—24 in the direction of the arrows as indicated in FIG. 23;
FIG. 25 is a transverse sectional view taken along the line 25—25 in the direction of the arrows as shown in FIG. 24;
FIG. 26 is a fragmentary sectional similar to FIG. 24, but showing the parts shifted to a different position;
FIG. 27 is a plan view of the positioning structures for the longitudinal or beam members of the pallet;
FIG. 28 is a view taken along the line 28—28 of FIG. 27;
FIG. 29 is a transverse sectional view taken along the line 29—29 of FIG. 28;
FIG. 30 is a plan view of one of the retaining elements forming a part of the machine;
FIG. 31 is a transverse sectional view taken along the line 31—31 in the direction of the arrows as indicated in FIG. 30;
FIG. 32 is a similar view taken along the line 32—32 in the direction of the arrows as also indicated in FIG. 30;
FIG. 33 is a transverse sectional view showing the pin mounting and adjacent mechanism;
FIG. 34 is a somewhat diagrammatic representation of the coupling mechanisms in the form of shaft chains employed to control movements of certain of the machine parts;
FIG. 35 is a similar view to FIG. 34, but showing an additional drive embodied in the apparatus;
FIGS. 36–39, inclusive, are perspective views showing schematically certain of the major movements of the apparatus by means of which a complete pallet or platform is provided;
FIG. 40 is a similar view of a complete pallet;
FIGS. 41–45, inclusive, are parti-sectional views illustrative of the cooperation of the parts at the several machine stations to produce a completed pallet or platform.

While the present machine may be employed to produce diverse types of units, it is preferred that the unit embrace a pallet presenting upper and lower faces defined by cross members in the form of boards secured together by longitudinal members or beams disposed between these faces. Thus, referring to FIG. 40, the numerals 51 designate the side beams and 52 of the central beam of the same. These elements may be of wood and embody the conventional sectional dimensions of 2 x 4 inches. The opposite faces of the pallet are defined by cross members 53 having sectional dimensions of, for example, 1 x 4 inches, and adjacent the ends and central areas of the deck surfaces members 54 may be disposed, which will include sectional dimensions of 1 x 6 inches.

While various securing expedients may be restored to in order to retain the parts of the pallet assembly against movements with respect to each other, nails are in many respects preferable. These have been indicated by the numeral 55. Therefore, a pallet is provided which will adequately support relatively heavy loads. At the same time, the forks of a lift truck may readily be disposed within the longitudinally extending spaces between the members 51 and 52 for the purpose of elevating, lowering or transporting the pallet.

Now considering FIGS. 1 and 2, it will be seen that a machine is presented which includes frame portions 56, 57 and 58. In the present description, the first of these portions is identified as the part defining the forward end of the machine, and 58 the assembly defining the rear end thereof. The intermediate frame portion 57 contains the mechanism for delivering cross members and for securing them against movement with respect to the longitudinally extending beams of the pallet. The beams are disposed in magazines from which they will be sequentially discharged as required.

As shown in FIG. 3a, the beam magazines may include pairs of opposed and vertically extending channel members 59. If the pallet is to include three longitudinally extending beams, as shown in FIG. 40, then three of these magazines are provided. Beams are conveniently transferred from the magazines to a carriage for delivery to the area defined by frame portion 57. Extending from one end of this portion (FIG. 2) are magazines 60 and 61 if—as is preferred—cross members of different sectional dimensions are to form a part of the pallet. Otherwise, only a single magazine will be necessary at this point.

Magazine 60 will receive and retain cross members having 1 x 6 inch sectional dimensions. Magazine 61 will receive a supply of cross members having sectional dimensions, for example, of 1 x 4 inches. These members will be fed into the area of frame portion 57 to be properly disposed with respect to the longitudinal beam members moving from the magazines defined by channels 59. Within the area of frame 57 these members will be brought to positions properly related with respect to each other and secured in those positions. For this purpose, units generally indicated at 62 may be mounted by frame portion 57. Such securing may be achieved by stapling, gluing, or nailing.

In certain instances nailing is preferable. For this reason such a mechanism has been herein shown. Except when limited by the claims, it is merely to be regarded as illustrative. Thus, units 62 may position and drive home nails 55 or equivalent securing elements. In this manner, the upper edges of the longitudinal beams will mount a deck portion comprising spaced transversely extending cross members. The feeding of the carriage supporting the pallet into the area embraced by frame portion 58 will then occur by mechanism hereinafter described.

It is now necessary that the partially completed pallet receive boards secured in contact with the lower edges of its longitudinal beams. For this purpose and by means of mechanism also hereinafter described, the carriage containing the partially formed pallet is moved rearwardly to frame portion 58, where it is turned over. Accordingly, the heretofore lower edges of the beams will then face upwardly.

It follows that the deck portion which has been formed will now provide the lower surface of the pallet. Thereupon, and again by operation of the conveying means, the carriage containing the partially formed pallet will be delivered into the area defined by framing 57. Here it will receive a series of cross members upon the upper edges of the longitudinal beam members and these cross members will be secured in properly spaced positions. Following this, the pallet will be shifted to a position adjacent the forward end of the machine, and the complete unit will be removed therefrom in any desired manner.

Figure 37:
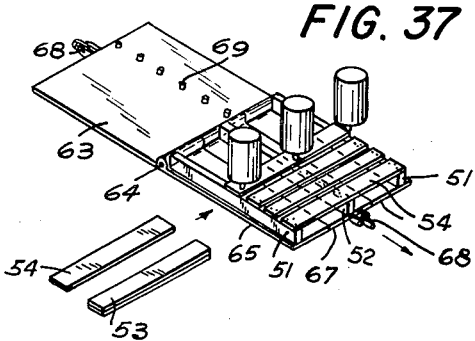

The foregoing sequence of operations has been schematically shown in FIGS. 36–39, in which the first figure shows the longitudinal beams 51 and 52 in transit towards units 62. Also in this view, stacks of cross members 53 and 54 are shown to one side of units 62. As illustrated in FIG. 37, with cross members 53 and 54 properly fed towards beams 51 and 52, they will rest upon and be secured to the latter by nails 55 to provide an upper deck portion. The partially completed pallet now moves to a point adjacent the rear of the machine where its position is reversed so that the formed deck portion then provides the lower face of the unit. In its return through the area defined by frame part 57, the edges of beams 51 and 52, extending in upward directions, will again receive a series of cross members 53 and 54, so that the second deck portion is completed.

Figure 39:
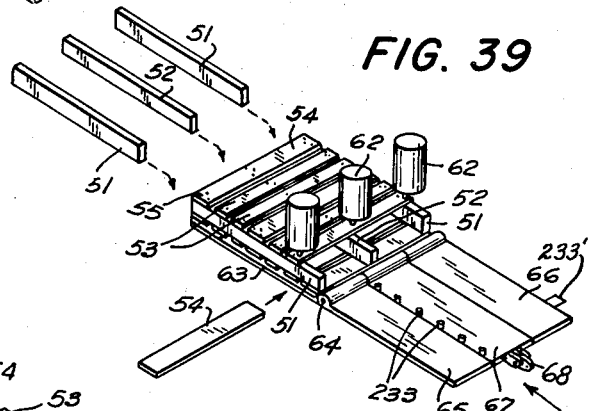
Figure 40:
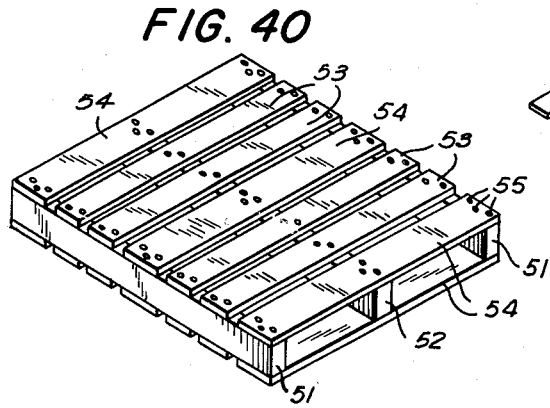

The pallet member will now move from the position shown in FIG. 39 toward the forward end of the machine at which point it will be discharged or removed therefrom. Simultaneously, as shown in the latter figure, a second series of longitudinal beam members 51 and 52 will assume initial positions to move towards the central area of the machine. In accordance with the present teachings, it is definitely preferred to employ a carriage which will remain in association with the several beams and boards of the pallet in its traversal of the machine, as afore described.

In FIGS. 36–39 the carriage has been shown somewhat schematically. It includes a rear plate 63 provided with a hinge 64 at its forward end. To this hinge there is coupled the front end of the carriage. That front end embraces side panels 65 and 66 together with a central panel 67. Panels 65 and 66 may be swung with respect to panel 67. One end of a conveyor chain 68 is attached to the front edge of panel 67. The opposite end of that conveyor is attached to the rear end of plate 63. Control members in the form of dogs 69 and 233 extend outwardly from the carriage. The purpose of these dogs will be hereinafter described.

In actual practice, it is preferred that the carriage embody a structure as generally shown in FIG. 2. As such, its rear portion will include upwardly facing pairs of channel members 70 providing its sides. Those channel members of each pair which extend towards the extreme rear portion 58 of the machine are secured for movements in unison with each other by a transversely extending shaft 71 forming a part of the carriage. A single central channel member 72 may extend throughout the rear end of the carriage. The shaft 71 corresponds to the hinge structure previously described under numeral 64 in FIGS. 36–39. All channel sections to the rear of shaft 71 (to the right as viewed in FIG. 2) are preferably true channels. Those parts of the carriage facing the forward end of the machine involve members 70' and 72'. Members 70' are angle elements. The forward end 72' of member 72 is flat. The two angle elements 70' extending toward the forward portion 56 of the machine provide, together with flat end 72' of member 72 which lies between them, an assembly corresponding to plate 63. The opposite channel elements 70 correspond to parts 65 and 66 and the intervening channel portion 72 corresponds to the central panel 67. The ends of chain 68 are secured to the opposite ends of member 72. It is apparent that the rear end of the carriage may be swung in the manner shown in FIG. 3c by moving the channel members 70 around the axis defined by shaft 71. In practice it is preferred that the dogs 69 and 233 be secured to extend outwardly from the side face of member 72 in groups one to each side of shaft 71.

Attention is directed to FIG. 34 in which the carriage-shifting conveyor 68 has been shown to best advantage. It preferably includes two spaced chains involving link assemblies passing around rotatably mounted pairs of sprockets 73 at the rear end of the machine, and sprockets 74 adjacent the lower end of, and substantially midway between, the ends of the rear machine zone. At the central zone of the machine the chains are supported by sprockets 75 and guided midway to the front zone of the machine by passing over sprockets 76. Adjacent the forward end of this front zone sprockets 77 are rotatably mounted for engagement with the chains.

As previously brought out, and as shown in this view, the ends of chain 68 are connected to the opposite ends of the carriage. It is preferred to have the upper sprocket of pair 75 connected to a suitable power source which will reversely drive the chain. Accordingly, the carriage will reciprocate by moving from the front towards the rear of the machine and from the latter back towards the front end thereof.

Now considering the preferred beam magazine and transfer structure including the three pairs of opposed end vertically extending channels 59, attention is directed to FIGS. 4, 7 and 8. In those views it will be seen that stationary and upwardly facing channel members 78 are supported by the machine frame to underlie each of the magazines. Members 79 are angle irons fastened to member 78 as shown in FIG. 5. Accordingly, while the forward ends of channels 78 will support beams, those elements will pass through the rear zones of these channels. The mechanism for effecting this movement will be hereinafter described.

Rotatably mounted at each of the magazines are shafts 80 (FIGS. 7 and 8). These shafts support at their ends cranks 81, and carrying pins 82 the rearmost of which may be spring pressed by spring 82a. A further crank 83 is attached to each shaft and connected to one end of a tension spring 84. Accordingly, pins 82 will tend to occupy positions at which they prevent beams 51 disposed within a magazine from moving into channel members 78. Additionally, attached to each shaft and extending across an end face of the magazine are cranks 85. These carry at their outer ends cam units 86 (see also FIG. 4). The latter will lie adjacent the side faces of the forwardly positioned magazine members 59 and extend forwardly of the same.

Now returning to a consideration of FIG. 34, it will be seen that in addition to the conveyor provided for by chains 68 in conjunction with the carriage, a second conveyor, preferably of chain type, has been shown at 87. A third conveyor is shown at 88 having pallet-engaging lugs 88. Both conveyors 87 and 88 conveniently involve pairs of chains disposed one adjacent each side of the machine and suitably spaced from each other.

Conveyor 87 passes around sprockets 89 adjacent the front end of the machine and thence around sprockets 90 and 91 positioned to the rear of the magazine 59. A motor-driven chain 92 connects with the shaft mounting sprocket 91 in order to rotate the latter and hence shift the conveyor 87. The latter continues beyond this sprocket towards the rear of the machine and passes over a sprocket 93 disposed forwardly of the central portion 57 of the apparatus.

Carried by the upper course of conveyor 87 at a point between sprockets 89 and 90 is a pusher bar 94. The motor drive 92 will be controlled so that conveyor chains 87 are reciprocated to move the bar throughout a range extending from a point forwardly of the magazine 59 to a point adjacent the rear ends of the same.

Conveyor 88 is supported between sprockets 95 and 96. The shaft mounting the latter has coupled to it a further sprocket connected by a drive chain 97 with a sprocket supported by the shaft which mounts sprocket 91. Accordingly, the chain 92 will serve to reciprocate both conveyors 87 and 88. The driving of conveyors 87 and 88 will be timed to synchronize with certain movements of conveyor 68.

Mounted to the rear of each magazine and above channel members 78 are shafts 98. Those shafts in each instance support cranks 99, in line with the channel members 70' and 72', to the outer ends of which spring fingers 100 are attached. Those arms overlie channels 78, which are spaced from each other a distance equal to the distance between the outer channels 70 and the central channel 72 of the carriage. Supports 101 extend upwardly from the frame of the machine adjacent crank arms 99. Springs 102 have their ends connected to these supports. Their lower ends are coupled to arms 99. A second crank 103 is also carried by each shaft. The length of crank 103 is such that it will lie in the path of travel of pusher bar 94. Spring 102 will normally maintain these parts of the mechanism in elevated position as shown in full lines in FIG. 4. They are capable of moving in a counterclockwise direction to the position shown in dot-and-dash lines in that figure.

At a point between magazine 60 and 61 a further conveyor is disposed. A preferred form of the latter is illustrated in FIG. 35, and conveniently includes a chain 104 passing around a supporting sprocket and a driving sprocket 106. The latter is mounted upon a shaft to which a drive sprocket of reduced diameter is attached; teeth of the latter being engaged by a drive chain 107. A pusher member 105 is carried by conveyor 104 and travels down a well portion 108, shown in FIG. 12. Above the well portion a channel member 109 is disposed. Its base is slotted so that the pusher 105 may extend into the area encompassed by its sides.

As shown in FIGS. 11 and 12, magazines 60 and 61 are disposed one to each side of channel member 109, which extends below their lower ends. These magazines conveniently embrace corner pieces 110 spaced from each other distances such that, for example, stacks of 1 x 4 and 1 x 6 boards of suitable length may be accommodated within the different magazines. Lower deck surfaces 111 form a part of each of these assemblies. The inner edges of these decks terminate in line with the side members of channel 109. Adjacent the outer edges of the decks, feeding mechanisms are provided, one for each of the magazines. These mechanisms conveniently include hydraulic cylinders 112, within which pistons 113 are slidably mounted. Rods 114 extending inwardly from those pistons connect with slides 115, mounting pawls 116, which are pressed upwardly by spring 117. As shown, the base portions of the corner pieces 110 of each magazine are interrupted so that cross members may be displaced from the lowermost portion of a stack towards channel member 109. To this end supports 118 conveniently form parts of each magazine adjacent its base and serves to maintain the stack of cross members within the magazine spaced from the adjacent deck 111.

It is apparent that upon the projection of the pistons 113, pawls 116 will engage the outer edges of a desired lowermost cross member within a magazine and shift it to a position where it will fall into channel 109. In the retraction of each piston the connected pawl 116 will simply under-ride the lower surface of the cross member 53 or 54 which has dropped into the position upon the supporting portions 118. The cross member which has been dropped into channel 109 will be disposed within intermediate frame portion 57 of the machine by means of the pusher 105 carried by conveyor 104. This will engage the outer end surface of the cross member. While conveyor 104 may be shifted in any desired manner, it is preferred to employ a cylinder 119 connected to a suitable source of fluid pressure and actuating a piston rod 120 having its outer ends connected to chain 107. It is apparent, by the motion-multiplying mechanism provided at this point that despite the limited movement of piston rods 120 the range of movement of pusher 105 will be completely adequate. In other words, this pusher will engage the outer end of a cross member delivered from one of the magazines 60 or 61 and shift this member to a position wholly within the intermediate portion 57 of the frame.

Within this frame portion a board receiving mechanism is provided. That mechanism is illustrated to best advantage in FIGS. 13 and 14 taken in conjunction with FIG. 3b. More particularly, adjacent opposite side edges of the intermediate frame portion, fork members are disposed. These each include an upper short arm 123 and a lower arm 121 which is relatively long. At least arm 121 may have a pivoted outer end portion 122. This will swing upwardly if it engages with a cross member previously secured to beams. These arms are supported by two shafts each of which is indicated by numeral 124 mounted for rotation and having a vertical axis. Shafts 124 are also supported for vertical movement with the heads 62. A crank 125 is secured to each shaft and connected with a piston rod 126 extending into a cylinder 127 connectable with a source of fluid pressure such that the piston coupled to rod 126 will be caused to project. This will result in cranks 125 rocking to shift the forked member carried by the lower end of shaft 124 from the position shown in full lines in FIG. 14 to that indicated in dash lines. The distance separating arms 121 and 123 is slightly in excess thickness of the cross member receivable therein. The distance separating the two shafts 124 is less than the length of a cross member.

Fixedly mounted upon an adjacent frame portion 128 of the machine is a block 128' carrying a pair of downwardly extending pawls 129 and 130 respectively. One of these assemblies will be provided to the rear of each of the shafts 124. Springs 131 have their opposite ends secured to the blocks 128' and frame portions 128. Therefore, the former are normally urged to the left as viewed in FIG. 13. The distance between the edge of pawl 129 and the crotch of the adjacent fork 121–123, is substantially equal in the present exemplification to the width of a 1 x 4 board when the slide is thus shifted by the spring. The distance between the edge of pawl 130 and that fork portion is under the same circumstances equal to the width of a 1 x 6 board. Each of the pawls are capable of vertical movement and as shown have lower cam faces. This downward movement is limited to a position where their lower ends are just above the plane of the upper surface of arm 121; this being conveniently achieved by pins 132 carried by the pawls and engaging with the upper surface of the block 128'.

Considering FIG. 3b, it will be observed that the intermediate portion 57 of the frame encloses the forks and adjacent parts at a point forwardly of channel member 109. To the rear of that member assemblies are furnished each including a lever 133 pivotally supported as at 134 and provided with a crank 135. The latter is connected to the rod of a piston-cylinder assembly 136 supported for rocking movement by frame 57. Bar 137 is pivotally carried by the lower end of lever 133 and urged by spring 138 to a position at which its lower end is depressed to align with a deck portion of the machine (indicated at 139). This deck portion is aligned with the continuation of the channel member 109. It is apparent that when fluid enters the cylinder of assembly 136 it will cause the free end of bar 137 to move through opening 137' as shown in FIGS. 3b and 9 to contact the rear edge of a cross member delivered through channel 109 to supporting portion 139 and shift the member laterally in the direction of the forks. Ordinarily a pair of levers 133 may be provided to assure a definite placement of the cross member.

The mechanism for securing the cross members to the longitudinal beams may embody one of a number of different types as afore brought out. Conveniently it may embrace an apparatus as disclosed in my patent, aforeidentified, of which the present is a continuation-in-part. Otherwise, it may embody a suitable stapling mechanism or else an apparatus partially or wholly relying upon the proper application of adhesive to suitably bond the elements of the pallet or platform together. In the illustrated embodiment mechanism is shown generally similar to that disclosed in my prior application. In other words, nails are being relied upon to couple the elements of the pallet. Using nails having structural characteristics which resist to a very large extent withdrawal from a position into which they have been driven, it would even be unnecessary to employ a clinching or "kinking" expedient to insure against their loosening. Thus, one of the units indicated generally at 62, is shown in detail in FIGS. 15 to 18 inclusive.

In those views the numeral 140 indicates a base portion from which side walls 141 extend upwardly. (See FIG. 13.) A top member 142 is also provided as a part individual to each of the units 62. A plate 143 is pivotally suported as at 144 and mounts a laterally extending portion 145 upon which there is supported an electric motor 146. The latter carries upon its drive shaft a pulley 147 around which a belt 148 passes to drivingly engage pulleys secured to shafts 149 mounted for rotation on portion 145. The latter support at their lower ends drills 150, preferably by means of releasable chucks (not shown).

Pivotally connected as at 151, to an extension 152 of plate 143, is the rod 153 of a piston-cylinder assembly indicated at 154. The cylinder of that assembly is connected to a relatively fixed member, such as for example side wall 141. Plate 140 is formed with a central opening 155. On each side of that opening stops 156 are mounted by the base 140. These engage with plate 143 or parts extending therefrom in order to limit the swinging movements of that plate. Those movements are achieved by introucing fluid under pressure to one or the other side of the cylinder forming a part of assembly 154.

Each of the plates 143 mounts, on its face a casing 157. Nails are delivered through casing openings 143' adjacent the lower end of plate 143 at certain points in the operating cycle of the mechanism to provide the groupings of two or three nails 55 as aforedescribed. Extending beyond the upper end of casing 157 are plungers 158 which have head portions 159 preferably carrying pins 160. Those pins ride in slots 161 in plates 162 carried by the upper or head portion 142 of the unit. As plates 143 of the several units are swung around their pivots 144, the heads 159 of the plungers 158 will lie adjacent one or the other end of slots 161. When extending vertically they will register with parts 163 conveniently in the form of blocks carried by the upper member 142 of each unit.

A control cylinder 164 also forms a part of each unit and is preferably mounted by the rear face of plate 143. Extending from the cylinders are rods 165 carrying plates 166 against which the upper ends of shafts 149 bear. As will be observed those shafts are splined to the several pulleys driven by belt 148. As fluid under pressure is introduced into one end of a cylinder 164 rod 165 together with plate 166 will be projected. This will correspondingly project shafts 149 to extend the drills 150 carried thereby through opening 155. With fluid under pressure introduced into the opposite end of the cylinder 164 the parts will be retracted to the positions shown in FIG. 15.

Attention is next invited in FIGS. 15, 17 and 18 in which a mechanism is illustrated which may form a part of each unit and by the use of which a clinching or deforming of the nails will occur as illustrated in FIG. 19. In those views the numeral 264 indicates a motor to the shaft of which a pulley 265 is secured to drive a belt 266 encircling corresponding pulleys secured to the end of a rotatable shaft 167. Conveniently, a multiple-groove pulley 168 is affixed to the latter and drives a series of belts 169 which extend over three rotatable and multiple-groove pulleys 170. Each of the latter, by means of a splined connection, 171, is secured against rotation with respect to a shaft 172. Three of these shafts are secured by suitable couplings to a head plate carried by the outer end of a piston rod 173. The inner end of the latter is coupled to a piston within a power cylinder 174. It follows that with fluid under pressure admitted in the latter, it will retract to the position shown in FIG. 18. If fluid is introduced into that cylinder at an opposite end, the piston rod 173 will correspondingly project drills 175 of relatively large diameter when compared to drills 150 and occupying positions with respect to cross member 54 and beam 51, that a spacing of resultant drill holes will be equal to the spacing of those formed by drills 150.

Returning to a consideration of FIG. 9, it will be noted that the sides 141 and tops 142 of each of the three units are connected with identical beams 178 as indicated in FIG. 3b. These beams are slidably guided for vertical movement with respect to side members 179 defining the edge zones of the intermediate frame portion 57. Beams 178 are connected to cylinders 182 by piston rods 181 as shown in FIG. 9. The beams are therefore suspended on rods 181. Pressure applied to cylinder 182 allows for lowering or elevating beams 178. Plates 142 carry a series of cylinders 180 disposed one above each of units 62 and from which piston rods 180' extend. Those rods as in FIG. 15 are aligned with the openings in blocks 163. When in lowered position each of the units will firmly press against the cross members resting upon the upper edges of the beams or longitudinal elements of the pallet.

It will be understood that cross members 183 are provided throughout suitable intervals within the frame of the machine at a point below that at which the carriage moves. One of these members has been shown in FIG. 9. Also shown in that view are longitudinally extending supports or rails 184 mounted upon the cross members and slidably supporting the carriage as it is reciprocated from the front to the rear end of the machine and back again to the front.

In FIGS. 20, 21, and 22 the front portion of one of these angle elements 70' has been shown together with a retaining element which is to releasably bear against the end of a beam mounted in that member. The retainers associated with each channel member include a head portion 185 preferably presenting a bevelled upper edge and mounted on the ends of a pair of rods 186 slidably bearing against the surfaces of bores formed in a supporting block 187 carried by member 70'. Rods 186 are connected by a pin 188 to a rod 189 the end of which projects beyond an adjacent angle member 70'. Springs 190 are interposed between rods 187 and head portion 185 to normally maintain the latter in a projected position as shown in FIGS. 20 and 21. The rear end of rod 189 carries a collar 191 formed with a cam extension 192. The latter is of an area such that as the carriage moves towards the rear end of the machine it will enter an opening 193 formed in the rail 184 underlying angle member 70'.

Therefore, under continued movement of the carriage as illustrated in FIG. 22, this finger will be retained in contact with the edge of opening 193 to thereby retract rods 189 and 186. Such retraction will cause head portion 185 to be correspondingly moved against the expansive effort of spring 190. Accordingly, head 185 can be retracted to a position clear of that which would be occupied by the end zone of a beam 51 as shown in FIG. 22 in order to accept the "turned-over" pallet. As the carriage begins its return movement towards the forward end of the machine, finger 192 will move from the position shown in FIG. 22 to that shown in FIG. 21.

Due to the camming action between the forward face of finger 192 and the adjacent edge of opening 193, return movement of the carriage will result in this finger riding upwardly to the position shown in dot-dash lines, FIG. 21, and in contact with the underlying rail 184. Under these circumstances the beam-contacting member 185 will remain in position firmly engaging the adjacent beam end.

Attention is next directed to FIG. 23 in which there is included the transversely extending shaft 71 to which the rear channel members 70 are keyed. Shaft 71 has secured to its end a block 194 mounting adjacent its opposite ends rollers 195. Turning to FIG. 3c, the rear portion 58 of the frame may support a cylinder 196 from which a piston extends to provide a rack 197. The teeth of this rack engage with the teeth of a gear 198, fixed to a shaft which also mounts a sprocket as indicated at 199 over which passes a sprocket chain indicated at 200. The chain also passes over a sprocket gear rotatably supported by the frame (see FIG. 23) and having its axis in line with block 194. This latter sprocket gear supports a grooved end member 201, the width of that groove being such that the rollers 195 carried by block 194 may enter the same. Therefore, as the carriage reaches a point adjacent the rear of the machine, these rollers will ride into the groove of member 201 to a point at which the axis of shaft 71 will align within the axis of the sprocket gear driven by chain 200.

Thereupon with the carriage stationary, fluid may be introduced into cylinder 196 to cause a projection of rack 197 with a resultant turning of gear 198 and movement of chain 200. As a consequence of that movement the second sprocket gear aligned with shaft 71 will be rotated through 180°. Therefore, shaft 71 will be similarly rotated. It has secured to it the rear channel members 70 of the carriage and it will move those members as shown in FIG. 3c through a corresponding arc; they carrying with them a partially formed pallet. Therefore, this pallet will be transferred by such movement to a position overlying the angle elements 70' of the carriage and the flat element 72' of the central member. After a release of the pallet from association with the members 70 included in the rear portion of the carriage, that part of the assembly may then return to its normal position as shown in FIGS. 1 and 2.

This result will be achieved by admitting fluid under pressure to that end of cylinder 196 which will cause a retraction of rack 197. Thereafter, and as the carriage begins its return travel towards the forward end of the machine no impediment to this movement will exist because the groove of member 201 will extend horizontally and accordingly permit block 194 to freely withdraw rollers 195.

During reversal of the pallet at the rear end of the machine and incident to rotation of shaft 71 as aforedescribed, the partially formed units must be retained in association with the rear end of the carriage until that unit has been disposed upon the forward end of the carriage (i.e., the left-hand end thereof as viewed in FIG. 2). To achieve this result both ends of the partially formed pallet are retained against movement with respect to the rear end of the carriage by gripping opposite ends of the longitudinal beams. As shown in FIG. 23, such gripping will include retaining teeth 202 disposed adjacent the inner end of channel members 70 and 72 at a point rearwardly of shaft 71. These teeth will penetrate into the ends of beams 51 and 52, and if sufficiently elevated, may even engage the cross member 54 at the adjacent end of the partially finished pallet. The manner in which this engagement is effected will be hereinafter brought out. Additionally, latch fingers 203 having pointed free ends and disposed one adjacent each of the outer channel members 70 are pivotally supported in this position as at 204 for movement by block 203' (FIG. 9) to engage the beam. An operating extension 205 is preferably integral with each latch finger and extends to the opposite side of pivot 204. It is apparent that in this manner and as particularly shown in FIG. 23, the forward ends of beams 51 and 52 will be retained against movement with respect to channel members 70 and 72.

This relationship will prevail during the "flipping" or turning over of the partially formed pallet until it comes to rest on the forward end of the carriage. Cam members 206 are disposed forwardly of shaft 71 and mounted to extend to on side of angle element 70'. Therefore, when shaft 71 rotates the rear end of the carriage to swing through an arc as shown in FIG. 3c, extensions 205 of the latch fingers will ride in contact with the surfaces of cams 206 during the final stage of this movement. In so doing, and as shown in FIGS. 25 and 26, fingers 203 will be caused to swing on their pivots 204 thereby retracting the pointed ends of these fingers from the beams 51.

As will be understood, the units providing the pallet will vary in dimension. For example, if beams 51 and 52 involve cross sectional dimensions of 2 x 4 they may actually be supplied by the mill in sizes varying from these dimensions (plus or minus) to a substantial extent. Therefore, the channel members providing the rear end of the carriage must be made so that their receiving channels embrace excess dimensions. However, the beams disposed in those channels and regardless of their dimensions, must occupy certain predetermined positions in order that a perfect pallet will be constructed. To this end orienting assemblies adjacent the channel members as shown in FIGS. 27 to 29 inclusive are employed.

Those assemblies will include cup-shaped or segmental spheres 207 mounted for rotation on the outer ends of arms 208. The latter have their inner ends pivotally connected as at 209 to a part adjacent channel 70 and are conveniently furnished with stem portions 210. The outer ends of each of the latter are connected to one end of a spring 211. The opposite end of that spring is coupled to a part fixed with respect to the channel member. Extending laterally from stem 210 are angularly offset arms 212, the free ends of which converge towards each other. Under the influence of springs 211, the peripheral zones of rollers 207 extend into the space defined by the channel members through openings 213 formed in their side walls. When pressure is exerted on the free ends of arms 212 the latter will swing and expand springs 211 to rock arms 208 around their pivots 209 and thus withdraw the orienting units 207 out of engagement with the surfaces of the beam members. A cam member 205' (FIG. 2) located in the forward end of the frame and adjacent the stations at which the beam magazines are disposed, will engage these arms. This will occur as the carriage shifts towards the extreme forward end of the machine. Accordingly, the channel members will be free to receive beams at this point.

Attention is now invited to the rear end of the carriage in relation to the rear frame portion 58. In this connection FIGS. 30 to 32 inclusive are of primary interest. In the end zone of channel members 70, spikes 214 are slidably supported to oppose the rear end of a beam 51 disposed in that member. Projection of the spike is conveniently limited by a stop pin 215 engaging a block 216 supported by the channel member. A spring 217 encircles this spike adjacent its rear end and bears against a collar 214' secured to the spike. The opposite spring end bears against a partition 218 through which the spike extends. The extreme rear end of the spike is secured to a slide 219 supported for movement within the channel member 70. That slide is formed with slot 219' which receives projection 220' of crank 220, supported by a shaft 221 and from which an arm 222 extends. The latter conveniently carries an actuating pin 223. The manner in which this is caused to function will be hereinafter brought out. However, it will be apparent that if arm 222 is rocked, shaft 221 will be similarly moved together with crank 220. This will result in spike 214 being retracted to withdraw its point from the bear 51.

The central channel member, as in the lower portion of FIG. 30, carries a rod 224 for slidable movement with respect thereto. This rod instead of having a pointed end similar to that of spike 214 has a rounded end portion which engages against the rear end of central beam 52. Again a spring 225 normally maintains this bar in projected position. Adjacent the rear end of channel 72 a shaft 226 is rotatably supported and mounts an actuating arm 227 connected to retract rod 224 upon being shifted. Also shaft 226 carries crank arms 227 and 227'. As the platform reaches its rearmost position, crank arm 227 engages with an angularly extending surface 228 of the main frame through the medium of a roller 229 carried by its free end. So engaged, shaft 226 will be rocked to retract rod 224 and disengage it from the end of beam 52. It is to be remembered that channel member 72 does not swing upwardly in a manner similar to the rear ends of channel members 70. Such movement of channel member 70 is timed with the release of rod 224 from engagement with the adjacent beam 52, so that the latter may be swung upwardly in unison with the beams 51 and the cross pieces connected to each other and supported by channel members 70.

Adjacent both the forward and intermediate portion of the machine, cams 234 are provided (FIG. 33). These engage with the actuating pins 223 coupled to spikes 214. At the forward machine end and under movement of the carriage to that position the cams serve to retract spikes 214. A similar cam at this point serves to retract rod 224. Therefore, adequate space exists for the beams to be received within the channel members adjacent the forward end of the machine. As soon as the carriage begins its movement towards the rear the actuators of the spikes and rods are released by the cams. Accordingly, by means of the springs 217 and 225 those members are projected against the rear beam ends. By such projection the side beams of the pallet are forced into engagement with the teeth 202 to thus retain the beams against all movements with respect to the rear end of the carriage. This retaining effect will be supplemented by rod 224 which bearing against one end of the center beam will urge the opposite end of the beam into contact wtih a block surface of beam 51 forming a part of the carriage.

When the carriage moves to a position adjacent the rear end of the machine, pusher rod 224 will be retracted as a consequence of cam surface 228 located at that rear end. However, spikes 214 will not be so retracted. It is apparent that as the rear end of the carriage is rocked through 180°, the pallet will be retained against displacement with respect thereto. This will occur not alone because fingers 203 remain embedded in the side beams, but also because of spikes 214 and teeth 202 are likewise embedded to a retaining extent in the beams. It will be remembered that pusher rod 224 is associated with the center member 72 of the carriage which does not rock. Therefore, prior to the carriage moving back to the forward end of the machine, the pusher rod will remain in retracted position and thus not interfere with the swinging of the pallet. As the rear end portions of the carriage completely invert the pallet cam surface 234 is engaged by the actuating pins 223 (FIG. 33). This will result in a retraction of spikes 214 to free the side members of the pallet not alone from these spikes but also from teeth 202. Accordingly, the inverted pallet will be disposed upon the angle elements 70' and the flat member 72' of the carriage. Subsequently they will be retained against displacement by means of the rods 189 and contact members 185 associated with the forward carriage portion.

Throughout the machine micro switches are preferably employed and actuated in timed sequence to the movements of the several parts to assure a continuity of operation of the machine as hereinafter brought out. A casing 230, enclosing a control such as a micro switch has been shown in FIGS. 30 and 31. An actuating arm 231 extends from such casing and conveniently supports a roller 232. The latter is engaged by an actuator 233' carried in this instance by one of the side members 70 of the pallet-supporting carriage. Arm 231 may conveniently be urged by a spring (not shown) into the illustrated position so as to be engaged by actuator 233. In the control shown in these FIGS. 30 and 31, the switch governs the operation of the cylinder 196 to project and retract rack 197. Also, it interrupts movement of the carriage towards the rear end of the machine by means of conveyor 68. Actuators similar to the one identified under the numeral 233' have been diagrammatically shown in FIG. 39 and indicated by the same number. In actual practice it is preferred to secure these actuators to—for example—the central channel members 72 outstanding from one end of side face throughout the rear zone of the same and a second series of actuators outstanding from its opposite side face throughout the front zone of that member.

It will be remembered that pins 214 will remain in projected positions during the flipping operations of the pallet. In this manner the partially completed unit will be held in association with the rear end of channel members 70 until its position is reversed as in FIG. 38, and it is disposed immediately above the front end of the carriage. At this point it should be released from the spikes as well as the teeth 202 adjacent the opposite end of the beams. To achieve this result pins or cranks 223 are shifted. Such shifting as in FIGS. 20 and 23 is preferably accomplished by a cam member 234 conveniently mounting on a cross member indicated at 234' (FIGS. 3b and 6).

Figure 38:
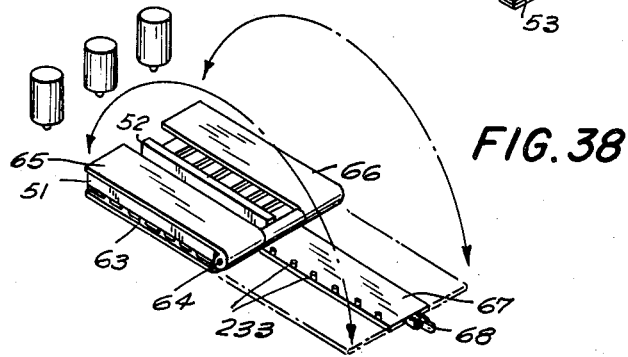

It is apparent, as the rear ends of channel members 70 swing through an arc of 180° from their position shown in FIG. 37 to that illustrated in FIG. 38, that cams 234 (FIG. 33) will cause retraction of the spikes 214 to free them from the adjacent beams. Simultaneously, the pressure upon the latter will be relieved so that they will free themselves from teeth 202; the rear ends of channel members 70, then returning to their normal position as in FIG. 39. At that time by a limit switch a reverse movement of the carriage is initiated to return the latter with the pallet supported thereby towards the front end of the machine. In such travel cross members will be applied to the longitudinal beams along the upper edges of the latter after which the carriage with its supported pallet will move to a point adjacent the forward end of the machine.

Considering the complete cycle of operation, it will be assumed if cross members involving two different dimensions are to be employed, as aforedescribed, that two magazines 60 and 61, are provided. Also, each of these magazines receive stacks of cross members involving proper dimensions. While only a pair of longitudinal beam members might be incorporated in a pallet, it is definitely preferred to employ three. Therefore again as disclosed in this application, three stacks of beam members will be disposed one within each of magazines 59. If nails or similar securing elements are employed to attach cross members to the beams and retain them in such position, then the magazines embraced within casings 157 will be supplied with quantities of those elements. According to whether the lower surface of the platform is to include the same member of cross members as the upper surface thereof, actuators as shown at 233 and 69 (FIGS. 36 to 39) will be associated with the carriage to operate micro switches for operation of shifting mechanism such that the carriage will be advanced a proper distance after each securing operation performed by unit 62.

Thus considering FIGS. 4, 7 and 8, the beam members will be supported in the magazines at positions above channels 78 due to the fact that shafts 80 maintain the spikes or retaining elements 82 in positions at which the lower beam members may not descend. Conveyor 87 (FIG. 34) will be shifting pusher rod 94 to the end of the machine. In so moving it will pass under arms 99, which is in the position shown in full lines in FIG. 4. Pusher rod 94 will continue its movement towards the forward end of the machine and under-ride cam 86, to shift it to the position also shown in full lines in FIG. 4. A rotary movement will accordingly be transmitted by arm 85 of each assembly to each shaft 80 to shift cranks 81 and thus retract the pins or spike 82. Accordingly, the longitudinal beam members 51 and 52 will drop into channel members 78 as shown in FIG. 8. A movement of pusher rod 94 will now occur in the direction of the rear end of the machine. With such movement cam 86 of each magazine assembly will descend. This will serve to maintain the next succeeding beam member in a magazine in elevated position due to the pins 82 preventing downward movement of the next succeeding beam. That beam will, of course, at that time be supported by the beam which has been delivered to the receiving channel 78.

As pusher rod 94 continues to move it will engage against the beam in channel 78 and push it towards the rear of the machine. Due to the fact that a single pusher rod is preferably employed, the three beam members delivered from the three magazines will be advanced in unison. Those ends of the beams which extend towards the rear of the machine will now move into the area of openings 79 as in FIGS. 4 and 5. The pusher rod will move successively through the positions shown in dot-and-dash lines in the former figure. Each of cranks 103 will extend in a direction such that it will intercept the pusher rod 94. Therefore, the latter will engage it and cause it to move in a counterclockwise direction. Simultaneously, all beams will drop through the openings 79 and be received within the channel, 70 and 72. Arms 99 swinging downwardly will cause springs 100 to press against the beams to shift them to proper positions within those channels.

In properly timed sequence and simultaneously with the actual shifting of the beams, conveyor 68 will move the carriage so that those ends of the beams which are extending towards the rear of the machine will come to lie with their surfaces adjacent the ends of spikes 214 or rods 224 supported by the channel members at the rear end of the carriage. As carriage moves hook 192 moves upwardly releasing spring pressure 190 (FIG. 22). The cam member or abutment adjacent the forward end of the machine extends between arms 212 (FIG. 27) and will maintain the beam-orienting elements 207 in positions at which they do not extend into channels 72. Accordingly they will not interfere with the delivery of beams into those channels. Cam members adjacent the forward end of the machine will maintain latch fingers 203 in positions at which they are clear of channels 70 and 72. Crank 103 will continue to move in a counter-clockwise direction as a consequence of being rocked by pusher rod 94.

Accordingly, arms 99 will shift to the positions shown in dot-and-dash lines in FIG. 4, so that as the ends of the beams facing the forward end of the machine clear the edge defining openings 79 in each of channels 78, the beams will be forced down into firm contact with the base of the carriage channel within which it is received. Pusher rod 94 will continue its movements rocking cranks 103 in a continuing counter-clockwise direction until the rods clear these cranks. Thereupon spring 102 will return the cranks and arms 99 to the position shown in full lines ready for the next operation. With the continued movement of the carriage towards the rear end of the machine, arms 212 will move out of engagement with the cam. Accordingly, the orienting elements or members 207 under the influence of springs 211 will shift into engagement with the side faces of the beams and thus force them laterally within the channels of the carriage into predetermined and desired positions. It will be understood that the cam or actuating means for controlling arms 212 may take numerous different forms. Conveniently pins 205' may extend upwardly from the frame of the machine to intercept the path of travel of these arms and thus rock them.

The carriage with its rear zone supporting the beams within its channel members will now move to a position where it is in line with units 62 and with its rear end in registry with cross member 109. At this point its movement will be interrupted. A cross member will be delivered from its magazine to a position resting upon the adjacent edge zones of the beams. It will be assumed that in accordance with the present disclosure, this cross member will involve cross sectional dimensions of 1 x 6. Under those conditions and as in FIGS. 2, 11 and 12, the lowermost cross member will be engaged by the pawls fingers 116 of the side or block 115 and be moved laterally into channels 109. Thereafter it will be shifted by pusher member 105 moved by conveyor 104 to a delivery station above the beams carried by the longitudinally extending channel members 70 and 72 of the carriage. Cylinder 182 will under these circumstances have received fluid such that support 178 is in elevated position. So disposed the carriage may freely move thereunder.

Accordingly, the parts will be in the positions shown in FIG. 3b. Now by introducing fluid under pressure into cylinders 136, arm 133 will be rocked and the rods or other elements carried by arms 137 will engage the rear side edges of the cross member which has been delivered in position and shifted laterally in the direction of the forward end of the machine. So shifted it will be received by the fork members shown in FIGS. 13 and 14 and the sequential operation of which is illustrated in FIGS. 41 to 45. As will be seen in FIG. 41 the pusher arm or rod 137 moved a 1 x 6 inch cross member to a position under-riding the pawls 129 and 130 and resting upon the lower arms 121 to just clear the adjacent surfaces of upper arms 123. This lateral movement of the cross member will continue until the side edge facing the forward end of the machine contacts the base of the fork as in FIG. 42. Under these conditions and with the cross member involving the aforesaid dimensions outer pawl member 130 will drop downwardly.

Figure 41:
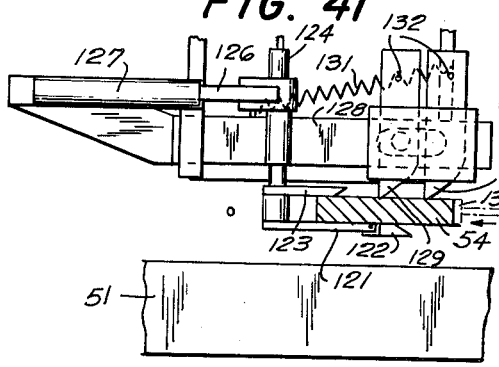
Figure 42:
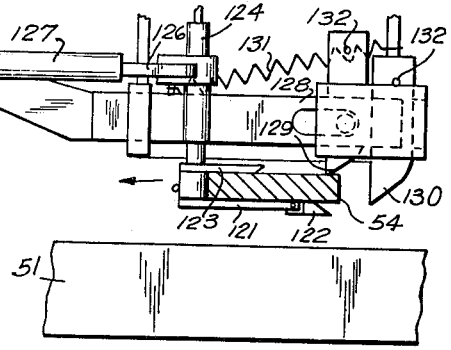
Figure 43:
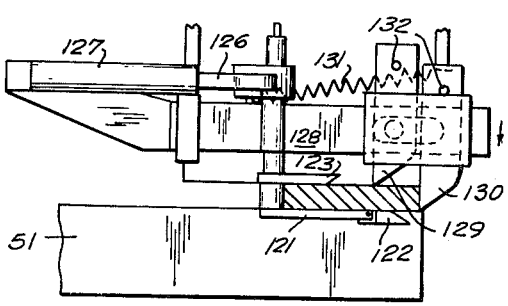
Figure 44:
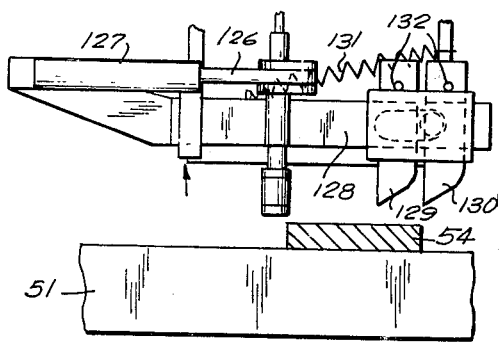
Figure 45:
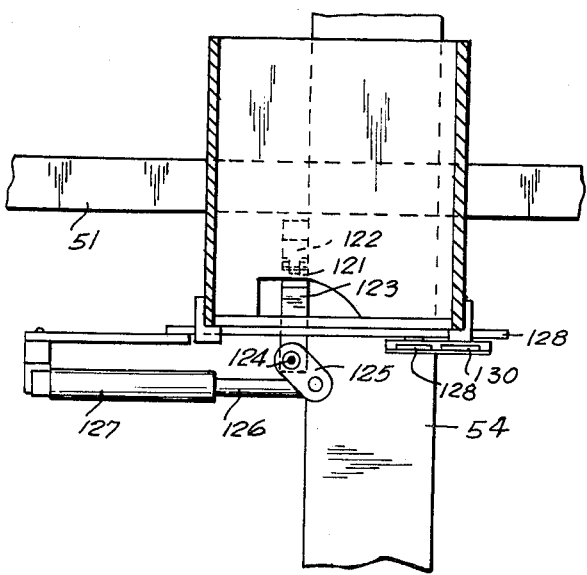

The entire assembly will now lower as in FIG. 41. Under these circumstances the cross member will rest upon the upper edges of the longitudinal beam members 51 and 52. Cylinder 127 will now control the turning of shafts 124 so that both of the fork members will shift inwardly as shown in FIG. 45. Also due to the simultaneous raising of the fork assemblies as in FIG. 44 these parts of the apparatus will clear a cross member which has been delivered to proper position at right angles to the beams supported in the rear end of the carriage. As the cross member is positioned upon the upper edges of the beams, cylinders 182 lower support 178 to cause the under surfaces of plates 140 to press against the cross member and thus prevent its displacement from a correct position.

If a securing apparatus for delivering and driving nails is employed as shown in FIGS. 15 to 18 inclusive, then the parts will be initially in the position shown in the first of these figures. Motor 146 will cause rotation of drills 150. Simultaneously fluid under pressure will be introduced into cylinders 164 to force the drills through the cross member and into the beams or longitudinal members. After this operation has been completed and again by introducing fluid under pressure into cylinder 184, the drills are elevated and their rotation may cease. Nails within magazine 157 will have been delivered to the lower ends of each of the assemblies as shown in FIG. 15. Cylinders 154 of each assembly will receive fluid to rock plates 143 around their pivots 144 and align the points of the nails at the lower delivery ends of the casings with the drill holes which have been formed.

If these nails are to be distorted or "kinked" as taught in my prior application, then the apparatus as shown in FIGS. 17 and 18 will be caused to function. This will involve a driving by motor 164 to rotate drills 175. The latter will be aligned with the nail holes formed by drills 150 and according to whether two or three nails are being employed. The introduction of fluid under pressure into cylinder 174 will cause drills 175 to be projected from the position shown in full lines in FIG. 18 to that indicated in dot and dash lines. Now with the axis of the nails at the lower end of magazine 157 in line with the openings previously formed in the cross member and even partially extending into those openings, fluid will be introduced into cylinders 180 to project pistons 181.

Therefore, plungers 158 will be engaged and also projected. The lower ends of these plungers being in line with the heads of the nails, the latter will be driven as in FIG. 19 to engage the drills 175 and pass around the same to permanently lock those nails in place and thereby prevent the cross member 53 from separating or otherwise moving with respect to the beams 51 or 52. Thereafter, drills 175 are withdrawn to the position shown in FIG. 118. Plungers 158 are also withdrawn and by means of the control provided by cylinder 154, plate 143 is rocked around pivot 144 to the position shown in full lines in FIG. 15. The entire operation may now again be repeated, it being understood that aside from other fastening elements and expedients being employed, that the drills and incidental apparatus illustrated in FIGS. 17 and 18 might, in many instances, be dispensed with.

As previously stated in connection with units 231, 232 and 233, micro switches or similar controls are conveniently employed to govern sequential operation of the several components of the assembly. Also with regards to the carriage, actuators such as 233 have been described as specifically controlling the sequence of functions occurring at the nailing heads or equivalent securing stations. In view of the fact that the positioning of actuators and micro switches or other controls and their inclusion in the wiring circuit together with relays, is well within the province of a skilled electrician, no illustration of this layout has been resorted to. Suffice to say that the present control of the machine at the securing station defined by the intermediate frame portion 57, involves four initial pairs of switches, operated according to whether a relatively thick actuator or cam 233 is attached to one of the side faces of the carriage or whether a relatively thin actuator of this type is employed at that particular station. The former would involve the delivery of a cross member having dimensions of 1 x 6 inches while a thin actuator would call for the delivery of a cross member involving 1 x 4 inches.

As the actuator on the carriage causes operation of a switch of the first pair a cross member corresponding to the paticular type actuator is caused to begin its travel towards the intermediate frame portion of the machine. Operation of a switch of the second pair causes interruption of movement of the carriage and its conveyor 68. Also, according to whether a 1 x 6 inch or 1 x 4 inch cross member is involved, the actuation of this switch will cause operation of either two or three drills (see nail groupings in connection with cross members 53 or 54 as in FIG. 40).

A switch of the third pair is operated by the beam engaged by the ends of the cross member which is being delivered. This controls rotation of the delivery forks as in FIG. 45. Both switches of the fourth pair are operated simultaneously when a cross member is at right angles to and in proper position with respect to longitudinal or beam unit. With the operation of these two switches the power head sequence is initiated. This involves: (a) lowering of the mechanism to clamp the board in seated position above the beam; (b) delivery of nails to the lower ends of the magazines in accordance with the number of drill holes which are to be formed and (c) the energization of a hold-in relay. The latter starts the motors which drive the drills and also controls the flow of fluid to the hydraulic cylinders 154 controlling the rocking of plate 143. Accordingly, the drills are disposed in planes normal to the cross members at the upper edges of the beams.

The rocking of the plates actuates two-pole limit switches. These control the valves governing the flow or pressure fluid to the pairs of hydraulic cylinders in each head. If only a 1 x 4 inch cross member is involved, then one cylinder is operated to lower two drills; however if 1 x 6 inch cross member is present, both cylinders operate to project three drills. Three limit switches are preferably employed, and these same switches initiate operation of an approximately two-second timing relay. During this period the drill operation is completed. As the relay ceases operation, it not alone stops the turning of drills 150, but controls the flow of fluid into cylinders 164 to raise them. During these latter steps the head remains in clamped associated with the cross member to maintain the latter in firm engagement with the beams. Two additional relays are controlled by the last-named relay to release nails in groups of either two or three to nail delivery mechanism, adjacent the lower end of the casings 157. As the drills are raised, three limit switches are actuated to cause the three hydraulic cylinders 154 to rock the plate 143 of the heads, and thus bring the nails into alignment with the drill holes.

With this movement of the parts circuits through the second of the limit switches are closed. These circuits control the flow of fluid to the three hydraulic cylinders 180 to push the ends of plungers 158 against the heads of the nails to drive them to positions at which the upper surfaces of those nails are at least in line with the upper surface of the cross member being secured. Simultaneously with the projection of plungers 158 a timing relay is energized. This functions to raise the plungers. As they are shifted upwardly three limit switches are operated. These control the functioning of the clamping cylinders 182 and their rods 181 to raise the heads. Such raising causes operations of two additional limit switches which initiate operation of the motor to drive conveyor 68 and shift the carriage to the next position where a second actuator causes recycling of the parts. The actuators on the forward end of the carriage control this initial cycling. Dogs on the rear end of the carriage preferably control the operating sequence during the return of the latter towards the forward end of the machine.

While the carriage is traveling through the intermediate portion of the frame, cam members 240 (see FIG. 23) rides in contact with a fixed pin 203' or other cooperating member to drive the pointed end of finger 203 into the adjacent beam member. Thus the latter is secured against movement with respect to the channel of the carriage within which it is disposed. The cross members being also secured to this beam their displacement will be prevented. As the carriage reaches a point adjacent its rearward limits of travel, fingers 192 secured to rods 189 at the forward end of the carriage will ride into openings 193, as in FIGS. 21 and 22, to withdraw contact heads 185 to the position shown in the latter figure. Spike 214 and rod 224 will be firmly engaged with one end of beam members 51 and 52 as previously described in connection with FIGURES 30 to 32 inclusive. The opposite ends of the beam members will be engaged by teeth 202. By means of switch 230 having its arms 231 rocked by actuator 233, rearward movement of the carriage will cease and drive 200 will be actuated by the flow of fluid into cylinder 196 to project rack 197. Accordingly, shaft 71 will turn to rock the rear portions of channel members 70 of the carriage.

The pallet will be firmly held. As the rocking operation is completed, fingers 203 will release as afore-described.

Such release will only occur as the rear end of the carriage has substantially completed its semi-circular movement. Under these circumstances the pallet will be in a position immediately above the forward zone of the carriage and over the unchanneled or lightly channeled portions of members 70 and 72. With the retraction of the plunger and pins 224 and 214, the pallet will be released from association with the rear end of the carriage. It is apparent that element 207 will not frictionally retain it in such association. Therefore, under the influence of gravity the pallet will drop onto the forward zone of the carriage; rods 189 remaining in retracted positions as in FIG. 22 to afford ample space for the pallet being so positioned. Thereupon, with the carriage moving towards the forward end of the machine fingers 192 will ride out of slots 193 as in FIG. 21, so that heads 185 will be projected by springs 190 into contact with the forward ends of the beam members.

With such shifting the partially completed pallet will assume a proper position within the carriage and related to the dogs or actuators 233, associated with the rear zone of the carriage. Conveyor 68 will under these circumstances continue to shift the carriage towards the forward end of the apparatus. The pallet which is now in a reverse position will have the upper edges of its longitudinal members of beams exposed.

Accordingly, as the carriage passes through the intermediate frame zone 57 of the machine, cross members will be disposed in proper positions upon the outer edges of the beams and according to the arrangements of actuators. In other words, the now uppermost portion of the pallet being actually the bottom thereof, a continuous series of cross members corresponding to those theretofore applied, to the beams, may be secured in position. Otherwise, only a minimal number thereof to rigidify the pallet may be thus secured.

If a nailing machine as illustrated and heretofore described is employed then the cross members and beams will again be drilled, nails will be positioned so that they may enter the drill holes and those nails will be driven to depths such that their heads are properly disposed with the cross members then being secured in position.

As the pallet moves forwardly of intermediate portion 57, the portion of the carriage upon which it is resting will be positioned to overlie the downward and forwardly inclined members 250. The angle elements 70' embraced in the forward end of the carriage will swing around shaft 71 and rest upon members 250. The flat members 72' will continue to underlie the pallet. Conveyor 88 comprising two pairs of chains is disposed in this zone. The upper courses of those conveyors extend slightly above the center member 72'. Therefore, the pallet will come to rest and be moved by conveyor 88 and thus delivered from the forward end of the machine. As it is so delivered, a micro switch will be operated which will initiate movement of conveyor 87 and the pusher rod 94 carried thereby. Accordingly, with the complete pallet providing no obstruction, the sequence of beam delivery from magazines 59 will again begin. Simultaneously conveyor 88 will impel the carriage along these members. Therefore, the completed pallet will be delivered or may be withdrawn from the forward end of the machine (see FIGS. 36–40).

Simultaneously with this operation the rear end of the carriage will move to a position intermediate the beam magazine defined by members 59 and the central zone of the apparatus. Also, conveyor 88 will move pusher rod 94, toward the forward end of the machine. Therefore, as in FIGS. 4, 5, 7 and 8 that pusher rod will shift the crank 103 associated with each magazine to the position shown in full lines in FIG. 4. Also, it will under-ride the cam elements 96 of the several beam magazines to release the lowermost units in each of the same into channels 78.

Accordingly, with the delivery of one complete pallet, the beam or longitudinal members of the next pallet will—as aforedescribed—be properly positioned within the channel members or supports in the rear zones of the carriage; the positioning rollers or elements 207 being maintained in the position at this station incident to their arms 212 engaging a cam or abutment surface to effect this result. The entire operation will now be repeated. It will be borne in mind that as the rear end of the carriage moves through the intermediate frame zone of the machine, arms 240 will be engaged by a pivoted spring-retracted pawl position in line with the central unit 62. So engaged the ends of fingers 203 will be shifted so as to embed their points into the faces of adjacent beam units, thus holding the latter against movement with respect to the channel members within which they are position.

Thus, among others, the several objects of the invention as specifically aforenoted are achieved. Obviously, numerous changes in construction and rearrangements of the parts may be resorted to without departing from the spirit of the invention as defined by the following claims.

I claim:

1. A machine for producing pallets embracing longitudinal beams and first and second groups of cross-members secured thereto, said machine including a frame having forward and rear ends, a carriage, retaining means for retaining said beams against displacement with respect to said carriage, power means for reciprocating said carriage between said frame ends, beam magazine adjacent the forward end of said machine, means responsive to the position of said carriage for delivering beams from said beam magazine to said retaining means, a cross-member magazine disposed at a position intermediate said beam magazine and the rear end of said frame, means for delivering said first cross member group from said cross member magazine to positions upon the edges of said beam members, securing means for securing said first group of cross members to said beams while maintaining their relative positions during movement of said carriage towards the rear end of the frame, means for inverting said beams and said first group of cross members, means for controlling said power means to cause said carriage to thereupon move towards the front frame end, means functioning during such latter movement to cause said second cross member group to be disposed upon said beams and said securing means securing said second group to said beams and said carriage continuing its movement towards the forward end of said frame.

2. In a machine as defined in claim 1, and a further conveyor adjacent the forward end of said machine for removing the pallet from said carriage.

3. In a machine as defined in claim 1, said means for delivering said cross-members from their magazine including an assembly and forks included in said assembly, said forks comprising shafts rotatably supported at the sides of said frame and pairs of arms secured one to each of said shafts, means for moving cross-members into positions between and supported by one of the arms of each pair and into engagement with adjacent fork shafts and means to rotate said shafts to withdraw said arms from positions supporting fork members and thereby deposit the latter in predetermined positions upon said longitudinal beams.

4. In a machine as defined in claim 3, and means in said assembly for laterally shifting cross-members towards the adjacent shaft of said forks.

5. In a machine as defined in claim 3, said securing means comprising nail-delivery means and means for driving nails through said cross-members into said beam members.

6. In a machine as defined in claim 5, said securing means additionally comprising drills, means for advancing and retracting such drills to form openings in said cross and beam members and said nail-driving means functioning after withdrawal of said drills.

7. A platform forming machine including in combination a supporting structure, beam and cross-member magazines spaced from each other within such structure, a conveyor mechanism, means for moving said conveyor, beam delivering means for delivering beams from said beam magazine to said conveyor in spaced relationship while said conveyor is in motion, cross-member delivering means for delivering cross-members from said cross-member magazine to positions on edges of said beams while said conveyor is in motion, securing means for securing said cross-members in position with respect to said beams and sequential actuating means for said beam delivering means, said cross-member delivering means and said securing means.

8. In a machine as defined in claim 7, said conveying mechanism comprising a carriage movable in one direction through said machine, said beam delivering means, said cross-member delivering means and said securing means being actuated by said sequential actuating means in response to such movement of the carriage, reversing means for reversing the direction of movement of said carriage through said machine and said cross-member delivering means and said securing means being actuated by said sequential actuating means in response to such reverse direction movement.

9. In a machine as defined in claim 8, said securing means comprising clamping means to clamp said members in engagement with each other during the operation of said securing means.

10. In a pallet-forming machine as defined in claim 8, said securing means comprising nail driving means and said power means being inoperative during such nail-driving operation to move said carriage.

11. In a machine as defined in claim 10, said securing means further comprising drill means for forming openings in said members to receive said nails.

12. A machine for producing pallets embracing longitudinal beams and first and second groups of cross-members secured thereto, a frame having forward and rear ends, a carriage movably supported on said frame, power means for reciprocating said carriage between said ends, means for disposing said beams on said carriage, means for disposing said first cross-member group on said beams, means for securing said first cross-member group to said beams during movement of carriage toward said rear end, said carriage including a hinged section, means for swinging said section to invert said beams and said first cross-member group disposed thereon at said rear end, means for controlling said power means to move said carriage from said rear end to said forward end, means functioning during movement of said carriage from said rear to forward ends to dispose said second cross-member group on said beams, and means for securing said second cross-member group to said beams.

13. In a pallet-forming machine as defined in claim 12, and means associated with said carriage, and functioning during the swinging thereof to retain said beams and first cross member group against movement with respect thereto.

14. In a pallet-forming machine as defined in claim 13, and means for rendering said retaining means inoperative upon the completion of such swinging movement.

15. A machine for producing pallets embracing beam members and first and second groups of cross-members including in combination a frame having forward and rear ends, a carriage, a first section of said carriage, a second section of said carriage hingedly connected to said first section, power means for projecting said carriage from said forward to said rear end, said beam members received by said first carriage section, depositing means for disposing said first group of cross-members on said beam members, securing means for securing said first group of cross-members to said beam members, means adjacent said rear end for swinging said first carriage section to deposit said beam members and said first group of cross-members in inverted position upon said second carriage section, means for causing said power means to move said carriage toward said forward end, said depositing means disposing said second group of cross-members on said beam members, and said securing means securing said second group of cross-members to said beam members.

16. In a machine as defined in claim 15, means for retaining said beam members against movement with respect to said first carriage section and means for rendering said retaining means inoperative upon said one carriage section swinging to a position above said other carriage section.

References Cited by the Examiner

UNITED STATES PATENTS 2,574,163  11/51  Bamford _____ 1—151 X

GRANVILLE Y. CUSTER, JR., *Primary Examiner.*